(12) United States Patent
LePage et al.

(10) Patent No.: US 12,026,717 B2
(45) Date of Patent: Jul. 2, 2024

(54) PAYMENT GATEWAY SECURITY MANAGEMENT

(71) Applicant: XPress Processing, LLC, Avon Lake, OH (US)

(72) Inventors: Debralee LePage, Chateauguay (CA); Joe LePage, Chateauguay (CA); Jesus Vega, Avon Lake, OH (US)

(73) Assignee: XPress Processing, LLC, Avon Lake, OH (US)

( * ) Notice: Subject to any disclaimer, the term of this patent is extended or adjusted under 35 U.S.C. 154(b) by 62 days.

(21) Appl. No.: 17/343,338

(22) Filed: Jun. 9, 2021

(65) Prior Publication Data

US 2021/0398127 A1  Dec. 23, 2021

Related U.S. Application Data

(60) Provisional application No. 63/040,903, filed on Jun. 18, 2020.

(51) Int. Cl.
*G06Q 20/00* (2012.01)
*G06Q 20/02* (2012.01)
(Continued)

(52) U.S. Cl.
CPC ....... *G06Q 20/4016* (2013.01); *G06Q 20/027* (2013.01); *G06Q 20/085* (2013.01);
(Continued)

(58) Field of Classification Search
CPC ............. G06Q 20/4016; G06Q 20/027; G06Q 20/085; G06Q 20/3825; G06Q 20/3829;
(Continued)

(56) References Cited

U.S. PATENT DOCUMENTS 6,002,767 A  12/1999  Kramer
8,079,082 B2  12/2011  Patel
(Continued)

OTHER PUBLICATIONS

Office Action dated Jan. 16, 2024, for Canadian Application No. 3,172,623, 5 pages.
(Continued)

*Primary Examiner* — Dante Ravetti
(74) *Attorney, Agent, or Firm* — BENESCH, FRIEDLANDER, COPLAN & ARONOFF LLP

(57) ABSTRACT

Methods for managing security of a payment gateway are provided. In one aspect, a method includes assigning a username and a security key to a merchant. The method includes receiving a transaction request associated with the merchant, wherein the transaction request comprises the username assigned to the merchant, request parameters, and a signature code associated with the merchant, and wherein the signature code comprises the request appended to both the username assigned to the merchant and the security key assigned to the merchant. The method includes determining, in response to receiving the transaction request associated with the merchant, whether the signature code of the request is authentic. The method includes validating the transaction request based on determining that the signature code of the request is authentic. Systems and machine-readable media are also provided.

18 Claims, 16 Drawing Sheets

(51) Int. Cl.
*G06Q 20/08* (2012.01)
*G06Q 20/38* (2012.01)
*G06Q 20/40* (2012.01)
*G06Q 40/02* (2023.01)
*H04L 9/40* (2022.01)
*G06N 3/02* (2006.01)

(52) U.S. Cl.
CPC ..... *G06Q 20/3825* (2013.01); *G06Q 20/3829* (2013.01); *G06Q 40/02* (2013.01); *H04L 63/0272* (2013.01); *H04L 63/0281* (2013.01); *H04L 63/062* (2013.01); *G06N 3/02* (2013.01)

(58) Field of Classification Search
CPC . G06Q 40/02; H04L 63/0272; H04L 63/0281; H04L 63/062; H04L 2463/102; H04L 63/126; G06N 3/02; H04W 12/104
See application file for complete search history.

(56) References Cited

U.S. PATENT DOCUMENTS

| | | | |
|---|---|---|---|
| 10,204,374 B1* | 2/2019 | Holan | G06Q 30/0637 |
| 10,417,702 B2 | 9/2019 | Vernal et al. | |
| 2011/0112931 A1 | 5/2011 | Hu et al. | |
| 2012/0130853 A1* | 5/2012 | Petri | G06Q 30/0609 |
| | | | 705/26.35 |
| 2015/0052064 A1* | 2/2015 | Karpenko | G06Q 20/3227 |
| | | | 705/71 |
| 2016/0149919 A1 | 5/2016 | Gauthier et al. | |
| 2021/0224810 A1* | 7/2021 | Benkreira | G06Q 20/4016 |

OTHER PUBLICATIONS

EESR dated Feb. 15, 2024, for European Application No. 21825951. 3, 2 pages.

* cited by examiner

PAYMENT GATEWAY SECURITY MANAGEMENT

CROSS-REFERENCE TO RELATED APPLICATIONS

The present application claims the benefit of priority under 35 U.S.C. § 119 from U.S. Provisional Patent Application Ser. No. 63/040,903 entitled "PAYMENT GATEWAY SECURITY MANAGEMENT," filed on Jun. 18, 2020, the disclosure of which is hereby incorporated by reference in its entirety for all purposes.

TECHNICAL FIELD

The present disclosure generally relates to electronic commerce systems, and more specifically relates to payment gateway security management.

BACKGROUND

Conventional payment gateways facilitate payment transactions between payment portals and a front end processor, which may be a bank. Because the payment transactions often times include personal information, improvements to securely manage such information is desired.

The description provided in the background section should not be assumed to be prior art merely because it is mentioned in or associated with the background section. The background section may include information that describes one or more aspects of the subject technology.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

The disclosed systems and methods provide a confidential and secure management system for a payment gateway. For example, the disclosed system is a fully scalable cloud payment gateway. The payment gateway can be implemented as a modular system utilizing various microservices. In certain aspects, the payment gateway is designed with Hierarchical Model View Controller (HMVC). The payment gateway harness the power of cloud computing to solve performance and scalability issues, which may arise from high volume payment gateways.

The cloud architecture of the payment gateway provides fault tolerance and automatic scaling. In certain aspects, multiple front facing load balancers can be utilized in multiple regions. The automatic scaling feature can detect current load usage and determine the amount of resources needed to function appropriately, which allows for near 100% uptime. The disclosed systems and methods provides improvements to security management of the payment gateway.

Figure 1:
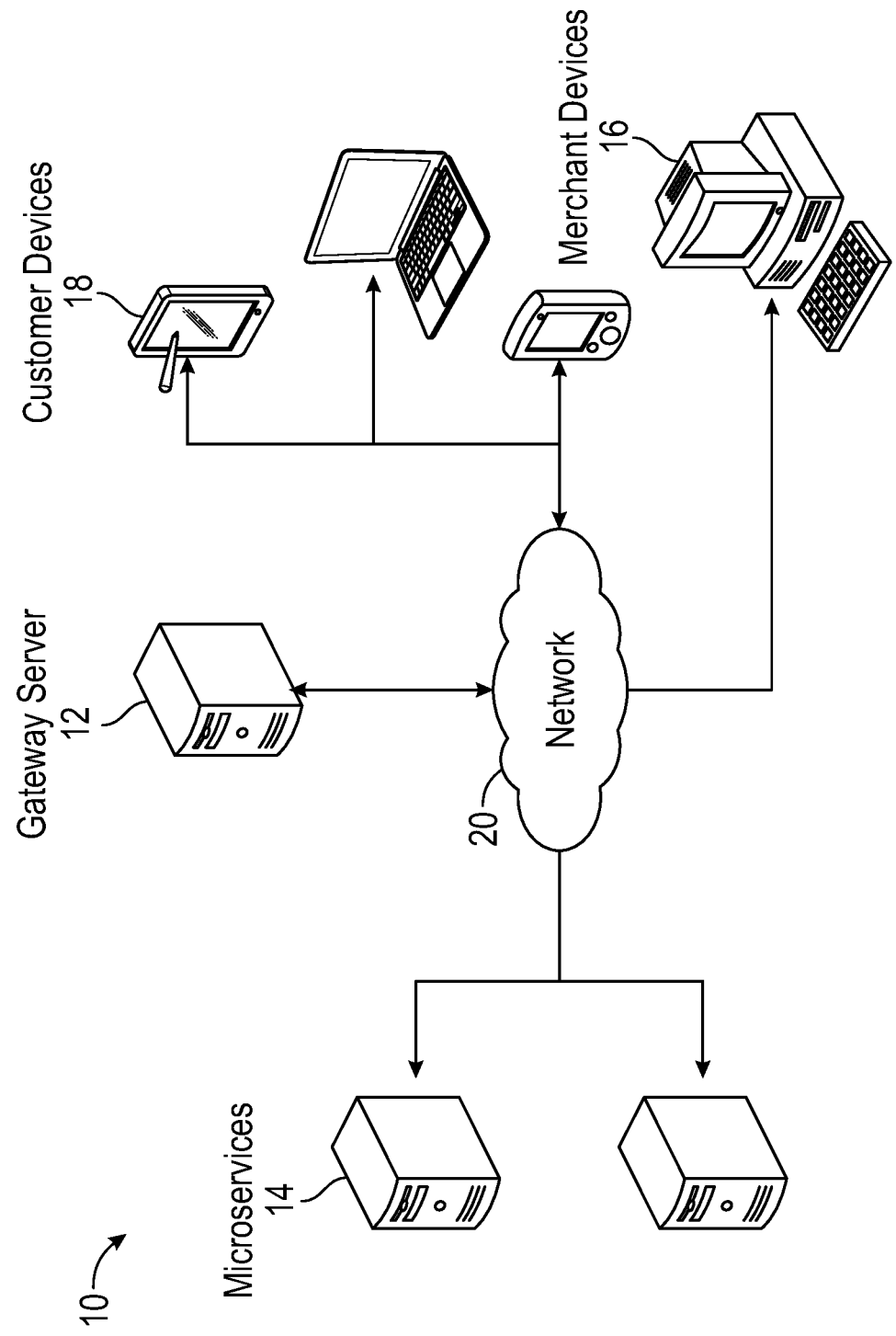
FIG. 1 illustrates an example architecture for managing security of a payment gateway, according to certain aspects of the disclosure.

FIG. 1 illustrates an example architecture 10 for managing security of a payment gateway system. The architecture 10 includes a gateway server 12, microservices 14, a merchant devices 16, and customer devices 18 connected over a network 20.

Figure 2:
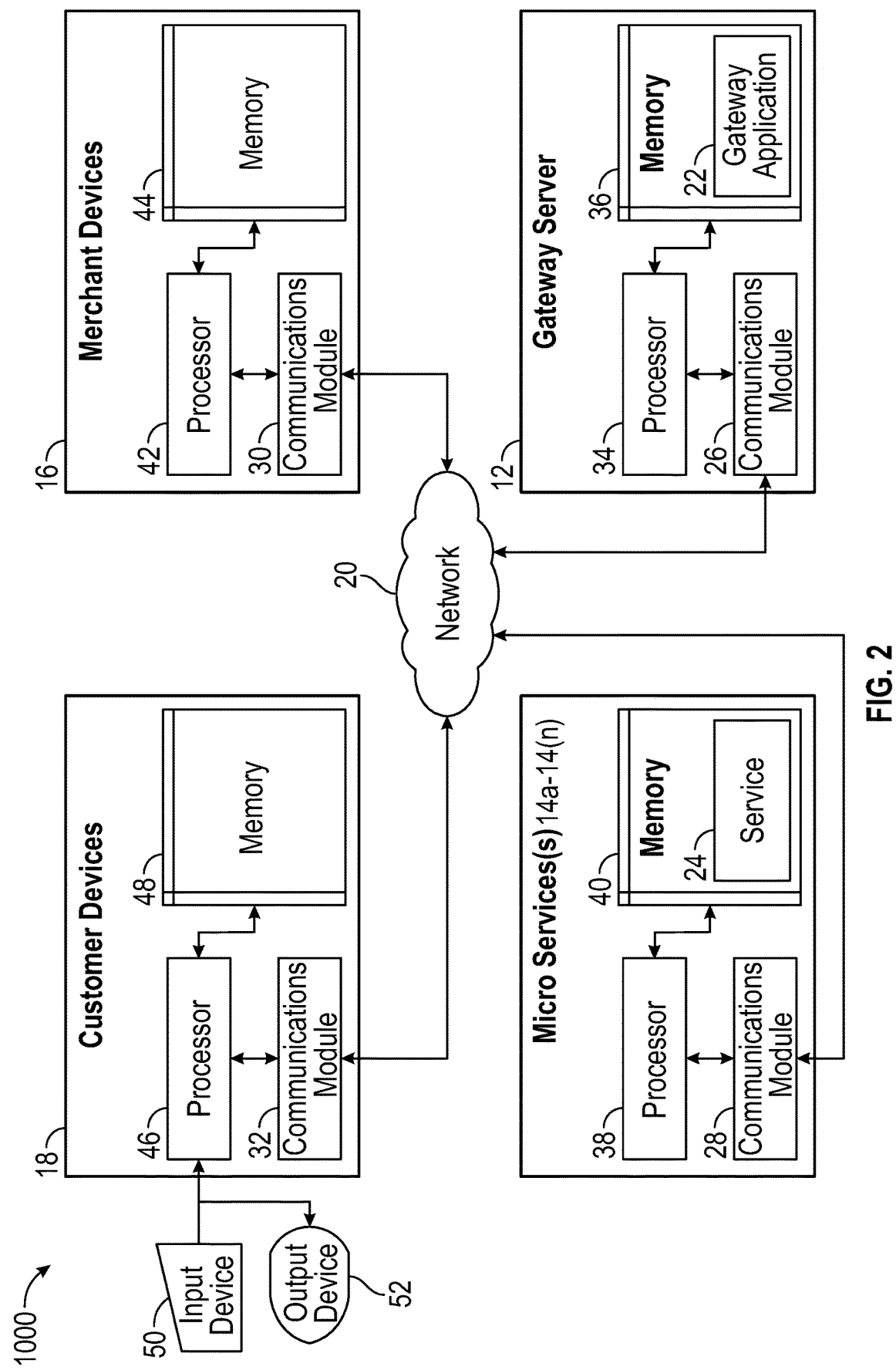
FIG. 2 is a block diagram illustrating the example servers, microservices, and devices from FIG. 1, according to certain aspects of the disclosure.

The gateway server 12 is configured to host a gateway application 22 (see FIG. 2). For purposes of load balancing, multiple servers can host the gateway application 22. In certain aspects, the gateway application 22 is a microservice. Each microservice 14a, 14b, 14c, . . . 14(n) of the microservices 14 can be a single server or can include multiple servers and can host a service such as, but not limited to, an administrative service, a merchant service, a referral service, a white-label service, an application service, a compliance service, a transaction service, a job service, and other services well-known in the industry. Each microservice 14a-14(n) of the microservices 14 is configured to host a corresponding service 24 (see FIG. 2).

The gateway server 12 can be any device having an appropriate processor, memory, and communications capability for hosting the gateway application 22. Each customer device of the customer devices 18 to which the gateway server 12 and the microservices 14 are connected over the network 20 can be for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities. In certain aspects, the gateway server 12 and the microservices 14 can be a cloud computing server of an infrastructure-as-a-service (IaaS) and be able to support a platform-as-a-service (PaaS) and software-as-a-service (SaaS) services.

The network 20 can include, for example, any one or more of a personal area network (PAN), a local area network (LAN), a campus area network (CAN), a metropolitan area network (MAN), a wide area network (WAN), a broadband network (BBN), the Internet, and the like. Further, the network 20 can include, but is not limited to, any one or more of the following network topologies, including a bus network, a star network, a ring network, a mesh network, a star-bus network, tree or hierarchical network, and the like.

FIG. 2 is a block diagram of an example payment gateway system 1000 illustrating examples of the gateway server 12, the microservices 14 (with one microservice illustrated for simplicity), the merchant devices 16 (with one merchant device illustrated for simplicity), and the customer devices 18 (with a generic microservice 14 illustrated for simplicity) in the example architecture 10 of FIG. 1, according to certain aspects of the disclosure.

The gateway server 12, the microservices 14, the merchant devices 16, and the customer devices 18 are connected over the network 20 via respective communication modules 26, 28, 30, 32. The communications modules 26, 28, 30, 32 are configured to interface with the network 20 to send and receive information, such as data, requests, responses, and commands to other devices on the network 20. The communications modules 26, 28, 30, 32 can be, for example, modems or Ethernet cards.

The gateway server 12 includes a processor 34, the communications module 26, and a memory 36 that includes the gateway application 22. The processor 34 of the gateway server 12 is configured to execute instructions, such as instructions physically coded into the processor 34, instructions received from software in the memory 36, or a combination of both. For example, the processor 34 of the gateway server 12 executes instructions from the gateway application 22 causing the processor 34 to perform.

Each microservice 14a, 14b, 14c, . . . 14(n) of the microservices 14 includes a processor 38, the communications module 28, and a memory 40 that includes the service 24. The processor 38 of each microservice 14a, 14b, 14c, . . . 14(n) is configured to execute instructions, such as instructions physically coded into the processor 38, instructions received from software in the memory 40, or a combination of both. For example, the processor 38 of each microservice 14a, 14b, 14c, . . . 14(n) executes instructions from the service 24 causing the processor 38 to perform.

Each merchant device of the merchant devices 16 include a processor 42, the communications module 30, and a memory 44. The processor 42 of each merchant device of the merchant devices 16 is configured to execute instructions, such as instructions physically coded into the processor 42, instructions received from software in the memory 44, or a combination of both. For example, the processor 42 of each merchant device of the merchant devices 16 executes instructions causing the processor 42 to perform.

Each customer device of the customer devices 18 includes a processor 46, the communications module 32, and a memory 48. Each customer device of the customer devices 18 also includes an input device 50, such as a screen interface, a keyboard, or a mouse, and an output device 52, such as a display. The processor 46 of each customer device of the customer devices 18 is configured to execute instructions, such as instructions physically coded into the processor 46, instructions received from software in memory 48, or a combination of both. For example, the processor 46 of each customer device of the customer devices 18 executes instructions causing the processor 46 to perform.

The techniques described herein may be implemented as method(s) that are performed by physical computing device (s); as one or more non-transitory computer-readable storage media storing instructions which, when executed by computing device(s), cause performance of the method(s); or, as physical computing device(s) that are specially configured with a combination of hardware and software that causes performance of the method(s).

Figure 3A:
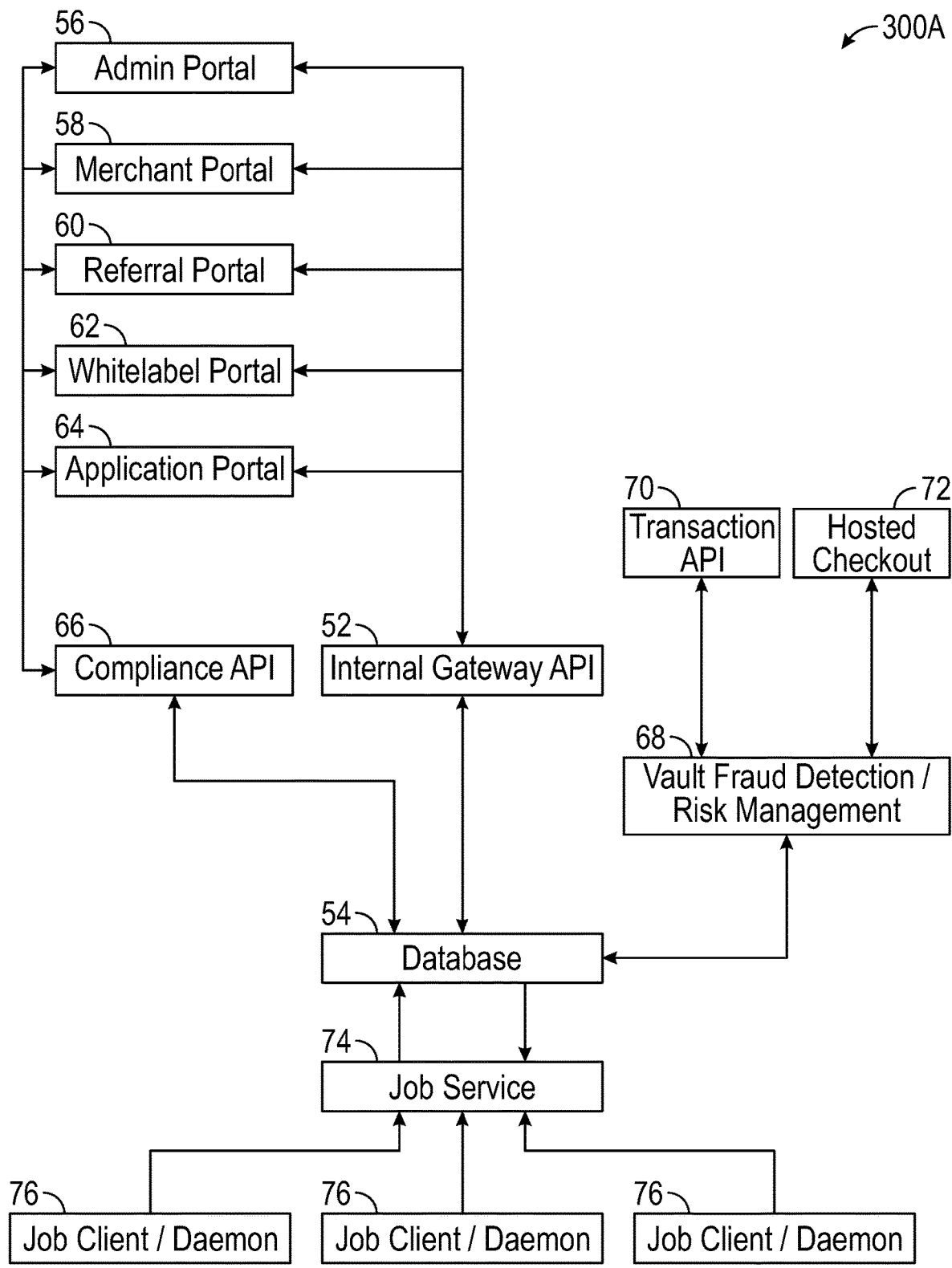
FIGS. 3A-3J illustrate further architectural details regarding FIGS. 1-2, according to certain aspects of the disclosure.

FIG. 3A is a block diagram 300A illustrating further architectural details regarding FIGS. 1-2, according to certain aspects of the disclosure. In certain aspects, the gateway server 12 can host the gateway Application Programming Interface (API) 52, which allows communication access to the microservices 14. For example, the gateway API 52 manages communications between a database 54 and an administrative portal 56 associated with an administrative microservice 14a, a merchant portal 58 associated with a merchant microservice 14b, a referral portal 60 associated with a referral microservice 14c, a white-label portal 62 associated with a white-label microservice 14d, an application portal 64 associated with an application microservice 14e, and other microservices. As illustrated in FIG. 3A, a compliance API 66 is in communication with the database 54 as well as with each of the administrative portal 56, the merchant portal 58, the referral portal 60, the white-label portal 62, and the application portal 64. In certain aspects, the compliance portal 66 is associated with a compliance microservice 14f.

As further illustrated in FIG. 3A, the database 54 is also in communication with a vault 68 configured for fraud detection and risk management. In certain aspects, the vault 68 is associated with a management microservice 14g. The vault 68 is also in communication with a transaction API 70 and a checkout 72, which can be hosted by the gateway server 12. In certain aspects, the transaction API 70 is associated with a transaction microservice 14h. The database 54 is also in communication with a job server 74. In certain aspects, the job server 74 is associated with a job microservice 14i. The job server 74 is in communication with a plurality of job clients 76.

Figure 3B:
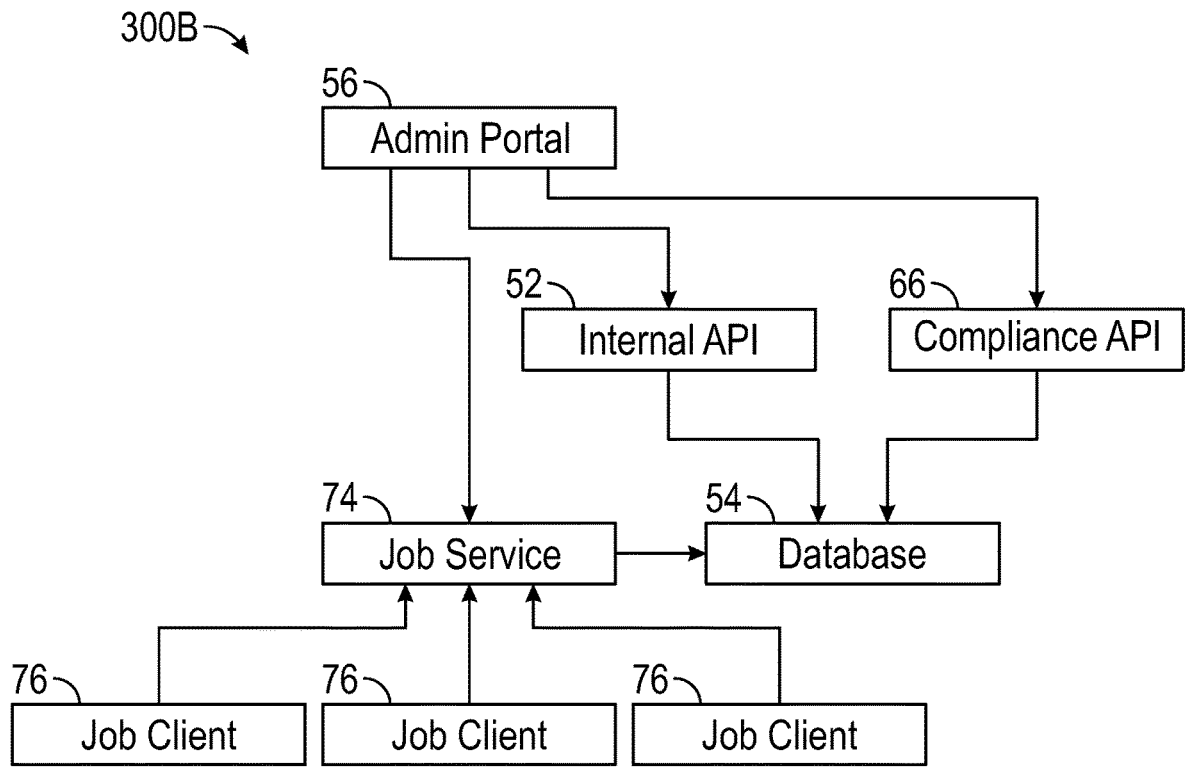

FIG. 3B is a block diagram 300B illustrating further architectural details regarding the administrative portal 56 associated with the administrative microservice 14a, according to certain aspects of the disclosure. For example, the administrative portal 56 is in communication the job server 74. The administrative microservice 14a is configured to manage the gateway application 22. As an example, the administrative microservice 14a provides personnel, such as, but not limited to administrators, accountants, technical supporters, and account managers, with access to manage may key functionalities and roles of the payment gateway system 1000. Integration of the administrative microservice 14a with the compliance API 66 also provides compliance personnel, such as, but not limited to compliance underwriters, access to manage and monitor risk assessment and underwriting functions, such as, but not limited to underwriting merchant applications and merchant accounts. The payment gateway system 1000 provides the underwriters, via the compliance API 66, and the merchants, via the merchant portal 58, to conveniently communicate to coordinate and facilitate collection of underwriting materials (e.g., documents, info, etc.) and requirements.

Figure 3C:
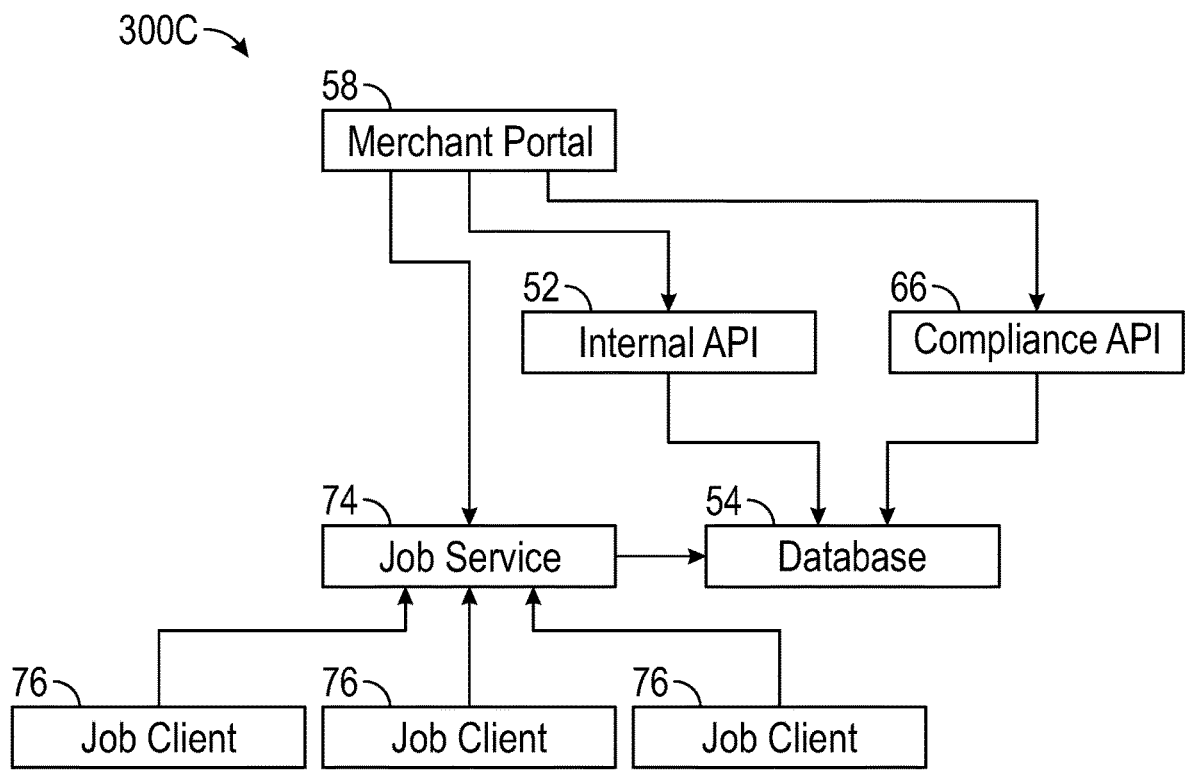

FIG. 3C is a block diagram 300C illustrating further architectural details regarding the merchant portal 58 associated with the merchant microservice 14b, according to certain aspects of the disclosure. For example, the merchant portal 58 is in communication with the job server 74. The merchant microservice 14b is configured to allow a merchant to login and manage corresponding merchant accounts via the merchant devices 16. In certain aspects, the merchant microservice 14b allows the merchant to have access to multiple corresponding merchant accounts. In certain aspects, the merchant microservice 14b transmits notifications to the merchant device 16 (e.g., electronic communications such as emails and texts) regarding status of the corresponding merchant accounts. In certain aspects, the merchant microservice 14b receives merchant information, such as documents to facilitate the underwriting process for a submitted application, from the merchant device 16. In certain aspects, the merchant microservice 14b allows the merchant to save the submitted application and update the submitted application at any time to complete the submitted application. As such, the process for applying for the merchant account provides convenience for the merchant.

In certain aspects, the merchant microservice 14b is configured to allow the merchant, via the merchant device 16, to manage the corresponding account settings such as, but not limited to, setting a multiple factor authentication (MFA) to be sent to a mobile device associated with the merchant. In certain aspects, the merchant microservice 14b is configured to provide the merchant access to data such as, but not limited to, documentation, support documents, files, and other information for integration with information received from either the transaction API 70 or the checkout 72 depending on which payment method and integration method is selected (e.g., selected by the merchant).

In certain aspects, the merchant microservice 14b is configured to provide a merchant user interface for searching and viewing transactions. In certain aspects, the transactions can be searched using paginated results to allow for robust datasets with robust performance of querying the database 54. In certain aspects, the merchant microservice 14b is configured to transmit the data of the merchant account activity in various selectable formats such as, but not limited to, comma-separated value (CVS), portable document format (PDF), spreadsheet, on-screen format, and other well-known formats in the industry.

In certain aspects, the merchant microservice 14b is configured to allow the merchant, via the merchant device 16, to view and download settlement information. In certain aspects, the settlement information is generated automatically by the payment gateway system 1000 (e.g., settle the merchant account activity and generate payouts to the merchant).

Figure 3D:
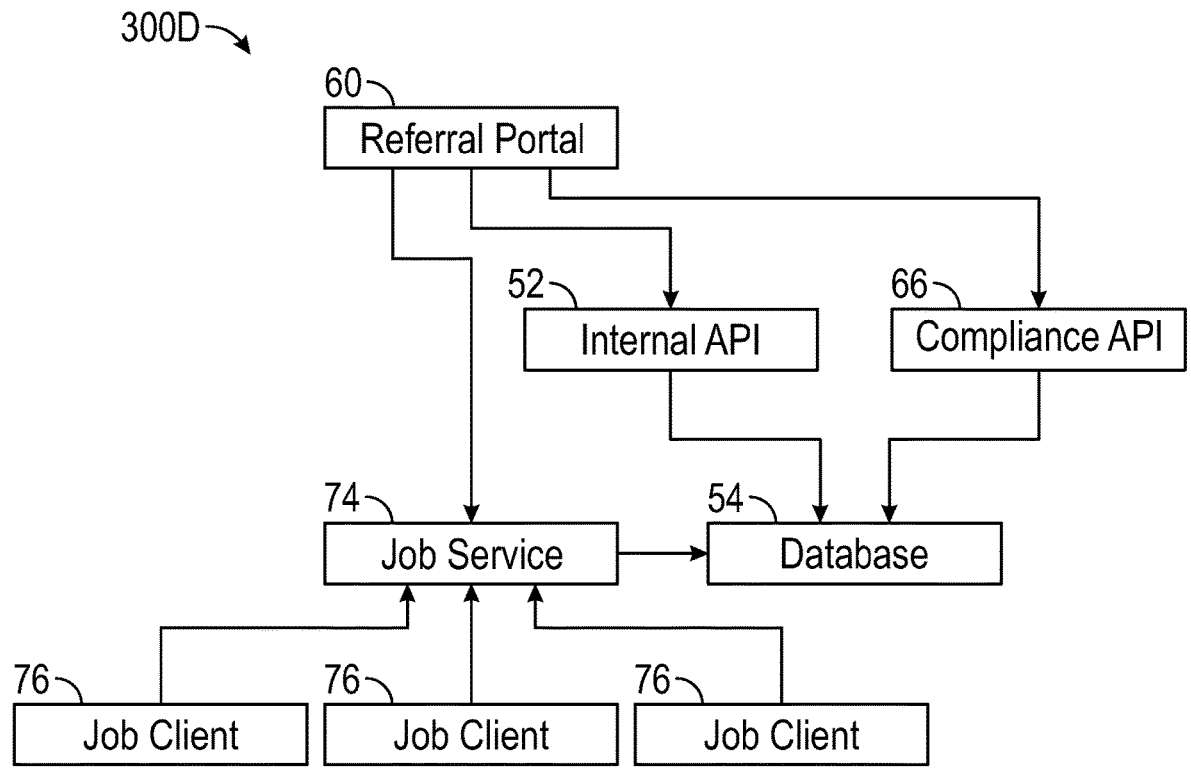

FIG. 3D is a block diagram 300D illustrating further architectural details regarding the referral portal 60 associated with the referral microservice 14c, according to certain aspects of the disclosure. For example, the referral portal 60 is in communication with the job server 74. The referral microservice 14c is configured to allow referrals to manage the merchant accounts, which the referrals referred to the payment gateway system 1000. For example, in certain aspects, the referral microservice 14c is configured to allow the referrals to manage referral account settings such as, but not limited to, managing referral login information, managing MFA settings, and managing other account settings well-known in the industry. In certain aspects, referral microservice 14c is configured to allow the referrals access the merchant account information associated with the referral. In certain aspects, the referral microservice 14c is configured to transmit the data of the referral account activity in various selectable formats such as, but not limited to, comma-separated value (CVS), portable document format (PDF), spreadsheet, on-screen format, and other well-known formats in the industry. In certain aspects, the referral microservice 14c is configured to transmit referral settlement information and referral payout activity to the referrals. In certain aspects, the referral microservice 14c is configured to transmit access links to the referrals such that the referrals can then transmit the access links to potential merchants who may apply for a merchant account.

Figure 3E:
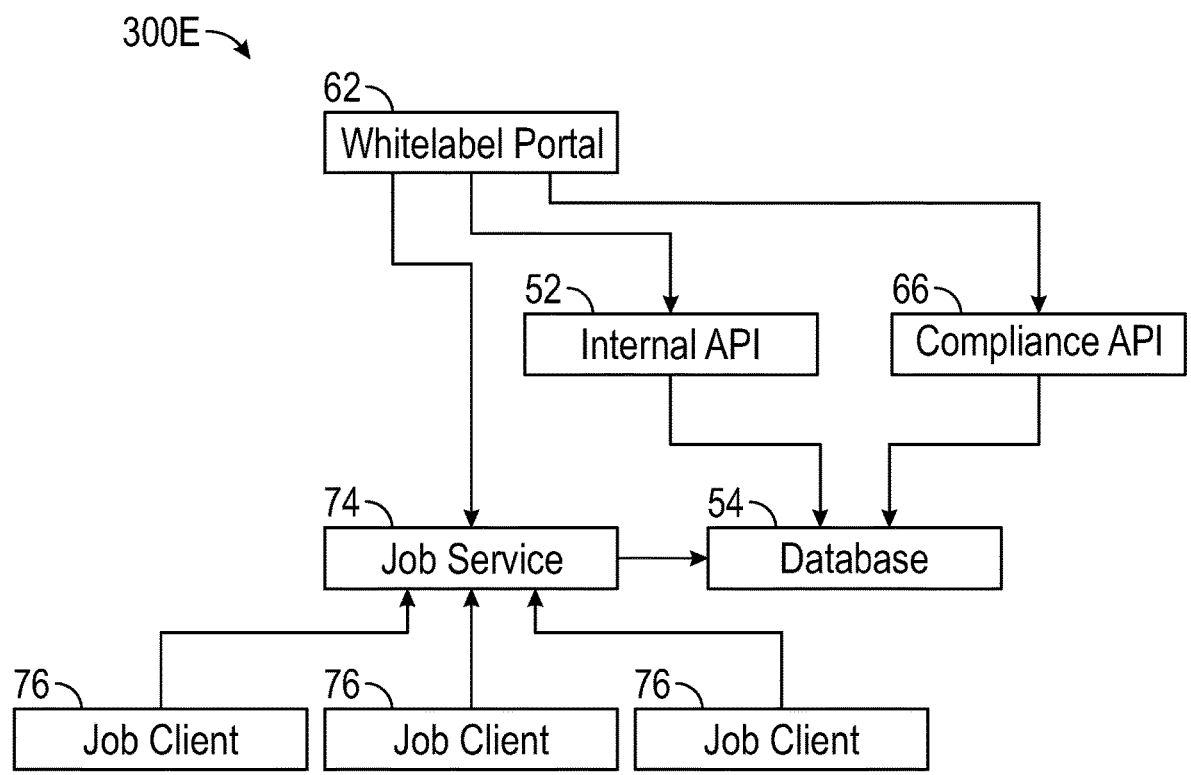

FIG. 3E is a block diagram 300E illustrating further architectural details regarding the white-label portal 62 associated with the white-label microservice 14d, according to certain aspects of the disclosure. For example, the white-label portal 62 is in communication with the job server 74. The white-label microservice 14d is configured to allow white-labels to manage the referral accounts and the merchant accounts that are associated with the corresponding white-label account. In certain aspects, the white-label microservice 14d is configured to create the white-label accounts. Each of the white-label accounts can be branded with a particular corresponding company information and logos. In certain aspects, the white-label microservice 14d is configured to allow customization of the user interface associated with the white-label account. In certain aspects, the white-label microservice 14d is configured to allow access to white-labels access to compliance information of the corresponding white-label account as well as access to compliance information and progress information to each of the referral accounts and merchant accounts that are associated with the white-label account.

In certain aspects, the white-label microservice 14d is configured to receive support requests from corresponding merchant accounts. In certain aspects, the white-label microservice 14d is configured to transmit the data of the white-label account activity in various selectable formats such as, but not limited to, comma-separated value (CVS), portable document format (PDF), spreadsheet, on-screen format, and other well-known formats in the industry. In certain aspects, the white-label microservice 14d is configured to transmit white-label settlement information and white-label payout activity to the white-labels. In certain aspects, the white-label microservice 14d is configured to provide a white-label user interface for searching and viewing transactions. As a result, in such aspects, the white-label can assist the corresponding merchant with any questions or support. In certain aspects, the transactions can be searched using paginated results to allow for robust datasets with robust performance of querying the database 54. In certain aspects, the white-label microservice 14d is configured to transmit access links to potential merchants who may apply for a merchant account and to potential referrals who may apply for a referral account.

Figure 3F:
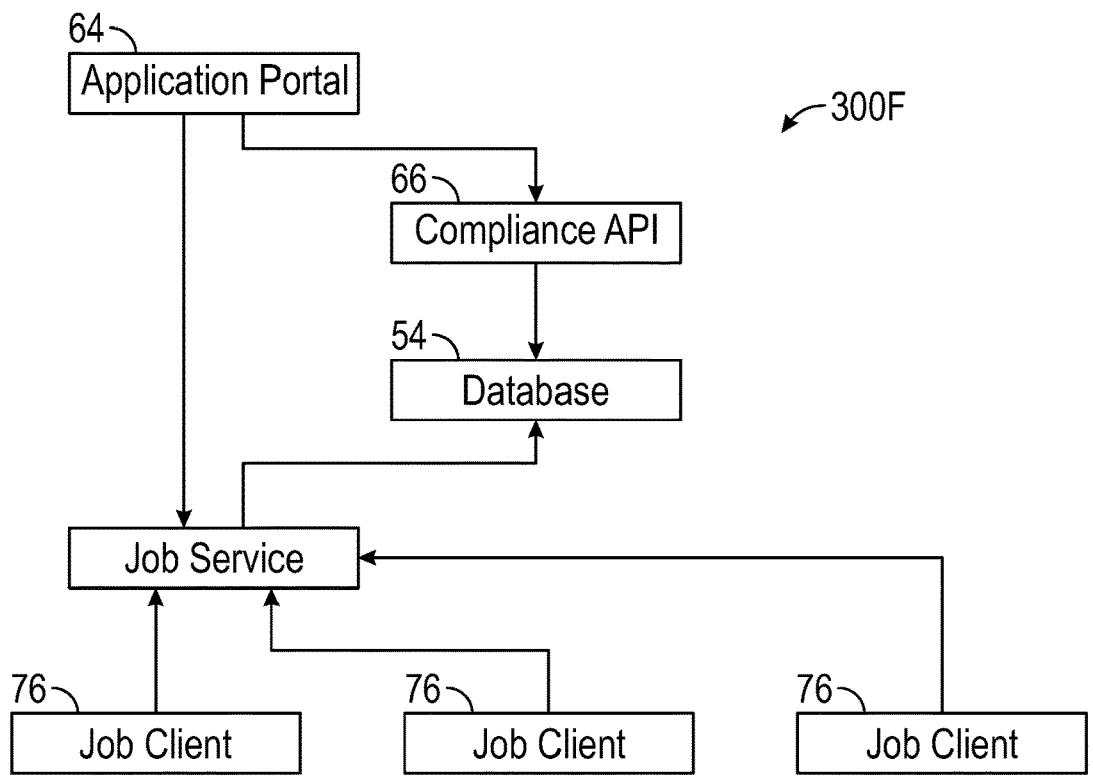

FIG. 3F is a block diagram 300F illustrating further architectural details regarding the application portal 64 associated with the application microservice 14e, according to certain aspects of the disclosure. For example, the application portal 64 is in communication with the job server 74. The application microservice 14e is configured to receive the referral applications for applying for the referral accounts, the merchant applications for applying for the merchant accounts, the white-label applications for applying for the white-label accounts, and other applications. In certain aspects, each of the applications can include information such as, but not limited to, company information, payment information, and other information well-known in the industry. In certain aspects, the application microservice 14*e* is configured to transmit requests and information to the white-label applicants, the referral applicants, and the merchant applicants who are applying to open accounts. In certain aspects, the application microservice 14*e* is configured to transmit submitted applications to the compliance portal 66 for processing. After the compliance microservice 14*f* processes the application, the application microservice 14*e* is configured to transmit account credentials to the white-label applicants, the referral applicants, and the merchant applicants. Once the credentials are received, the white-label applicants, the referral applicants, and the merchant applicants can login with the account credentials to the white-label portal 62, the referral portal 60, and the merchant portal 58, respectively. After login, the application microservice 14*e* is configured to allow access to application status and to receive any missing information that was flagged by the compliance microservice 14*f* When the application is completed, the application microservice 14*e* is configured to transmit the completed application to the administrative microservice 14*a* for underwriting.

Figure 3G:
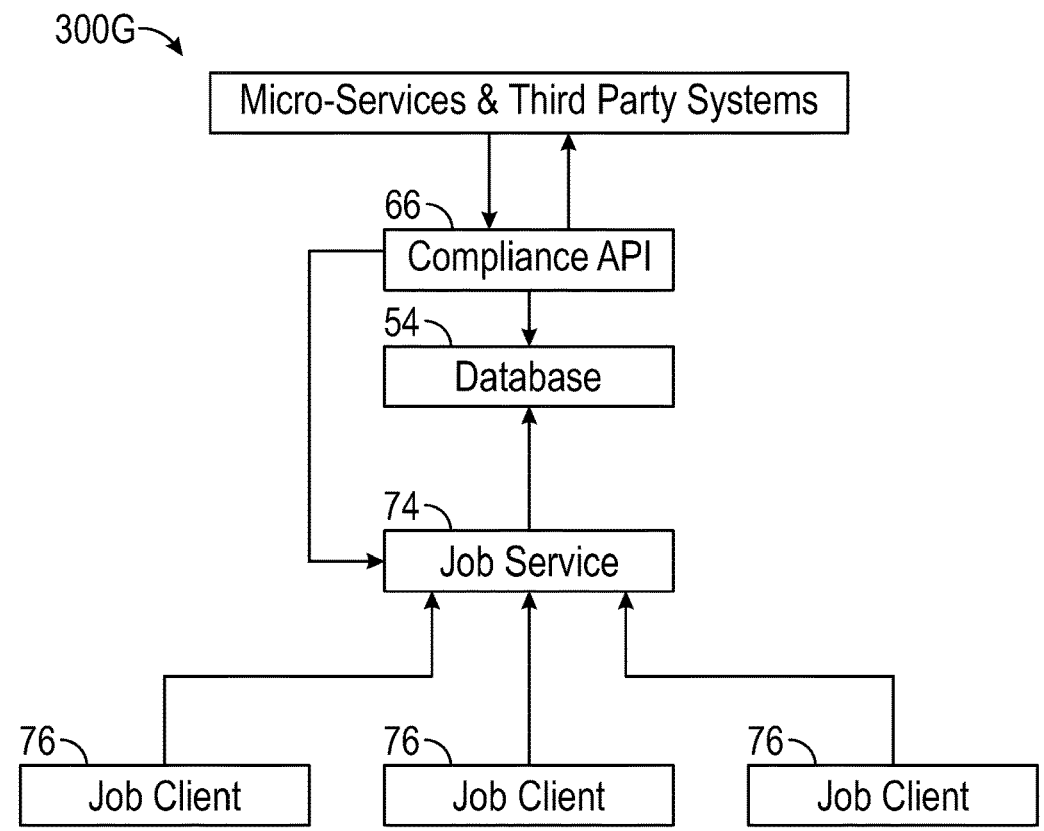

FIG. 3G is a block diagram 300G illustrating further architectural details regarding the compliance API 66 associated with the compliance microservice 14*f*, according to certain aspects of the disclosure. For example, the compliance API 66 is in communication with the job server 74, with other microservices described herein, and other third-party systems. In certain aspects, the compliance microservice 14*f* is configured as a customer relationship management (CRM) compliance microservice. In certain aspects, the compliance API 66 is implemented as a RESTful API (e.g., representational state transfer architecture). In certain aspects, the compliance microservice 14*f* is configured to process initial applications and manage the associated application information and documents. As the payment gateway system 1000 is designed to provide API centricity, the management of the compliance microservice 14*f* is provided through a single API.

With reference back to FIG. 3A, in certain aspects, the transaction API 70 is implemented as a RESTful API. In such aspects, this allows each merchant device of the merchant devices 16 to access to the payment gateway system 1000. In certain aspects, the transaction microservice 14*h* is configured to receive transaction requests from the merchant devices 16. In certain aspects, the transaction requests are implemented using Hypertext Protocol Transfer Secure (HTTPS). In certain aspects, the transaction API 70 can handle multiple payment method such as, but not limited to, vouchers, instant bank transfer, automated clearing house, credit card, and other payment methods well-known in the industry. The transaction API 70 is designed to integrate a robust amount of payment methods and payment providers by creating models within the payment gateway system 1000.

In certain aspects, the transaction microservice 14*h* is configured to process multiple payment methods as described above. In certain aspects, the transaction microservice 14*h* is configured to void transaction requests. In certain aspects, the transaction microservice 14*h* is configured to retrieve payments associated with returned transactions. In certain aspects, the transaction microservice 14*h* is configured to retrieve payment details and information of a particular transaction from the database 54.

In certain aspects, the transaction microservice 14*h* is configured to receive the transaction request, which includes a username associated with a merchant, request parameters, and a signature code associated with the merchant. In certain aspects, the signature code includes the request appended to both the username assigned to the merchant and the security key assigned to the merchant. In certain aspects, each transaction request includes the signature code which created by taking the alphabetically sorted POST parameters in JSON format and appends this to the username and the security key to make a string. This string is then hashed using SHA256 to complete the signature code. The transaction microservice 14*h* can then transmit the signature code along with the username assigned to the merchant and the transaction request (e.g., POST parameters). In this manner, the transaction microservice 14*h* verifies the transaction request to make sure that the transaction request had not been tampered with during transmission, and to thus, authenticate the merchant sending the transaction request. The security key is not sent in plain text, but instead is securely encrypted.

With reference back to FIG. 3A, in certain aspects, instead of selecting the transaction API 70 option, the checkout 72 is selected. The checkout 72 is configured to process payments of the transaction requests. For example, the checkout 72 is configured to receive customer information input on a secure page hosted by the gateway server 12. In such a manner, the merchant is relieved of the need to implement any additional security when inputting or storing customer billing information.

Figure 3H:
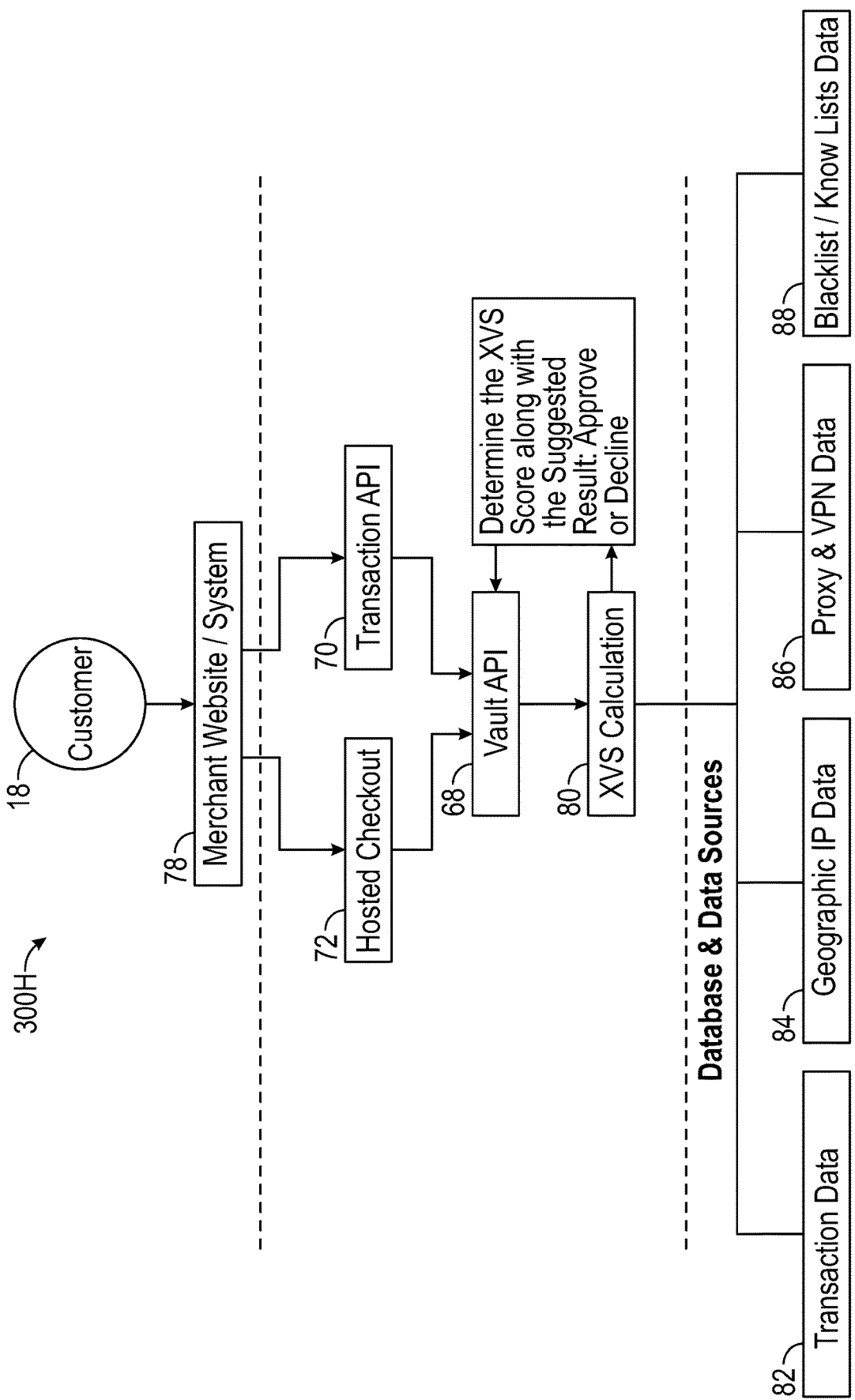

FIG. 3H is a block diagram 300H illustrating high level architectural details regarding the transaction API 70 and the checkout 72, according to certain aspects of the disclosure. The customer device 18 is in communication with the transaction API 70 via a merchant web site 78. Additionally, or alternatively, the customer device 18 is in communication with the checkout 72 via the merchant web site 78. Both the transaction API 70 and the checkout 72 are in communication with the vault 68. In certain aspects, the vault 68 is configured as fraud detection and risk management API. In certain aspects, the vault 68 is implemented as a RESTful API using HTTPS and POST methodology. The management microservice 14*g* of the vault 68 is configured to receive customer billing information in real-time and generate, via a calculation module 80 associated with the management microservice 14*g*, a risk score of probability of a particular transaction being fraudulent. In aspects, the risk score is referred to as an xpress vault score (XVS). In certain aspects, the risk score is generated by using multiple subroutines and processes. In certain aspects, the risk score is generated by using an artificial intelligence (AI) neural network. In certain aspects, the risk score is based on factors such as, but not limited to, historical transaction data of the merchant, historical transaction data of the customer, location of the merchant device, location of the customer device, relative location of the initiated transaction in relation to the billing information submitted by the customer, an internet protocol (IP) address, a blacklist listing proxies, valid banking information of the customer including routing number and account number, and other factors well-known in the industry. For example, in certain aspects, the calculation module 80 of the management microservice 14*g* accesses various databases and/or data resources such as, but not limited to, a transaction database 82 including historical transaction data, a geographic IP database 84 including location information, a proxy and VPN database 86 including proxy and VPN information, a blacklist database 88 including information related to blacklisted proxies, and other such well-known databases in the industry.

Figure 3I:
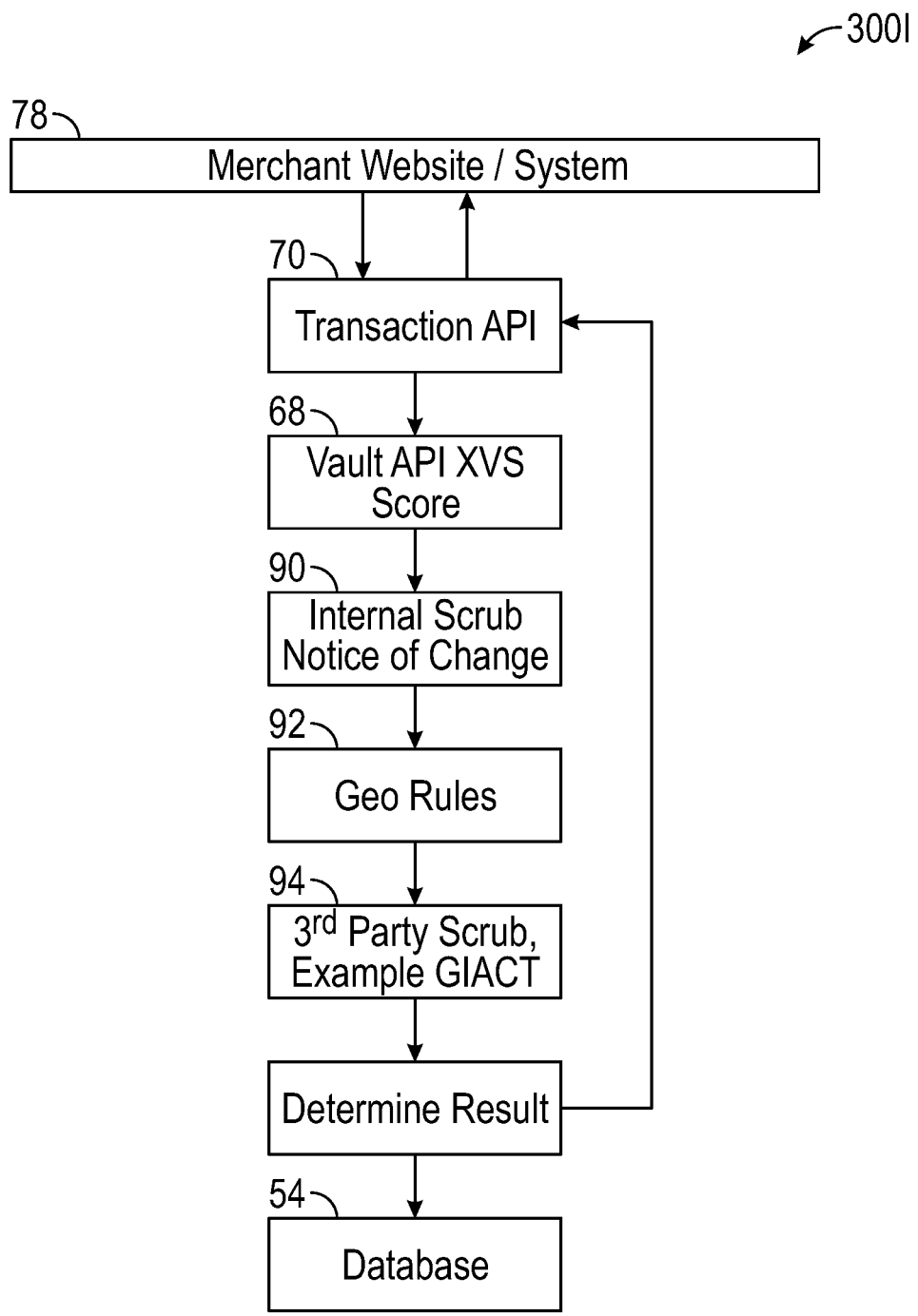

FIG. 3I is a block diagram 300I illustrating further architectural details regarding the transaction API 70, according to certain aspects of the disclosure. In certain aspects, the transaction API 70 receives the transaction request and communicates with the vault 68 such that the management microservice 14g generates the risk score. In certain aspects, the management microservice 14g of the vault 68 generates the risk score by communicating with a scrub module 90, a geolocation rules module 92, and a fraud detection service 94. In certain aspects, the fraud detection service 94 is an internal service, a third party service, or a combination of both. In certain aspects, the risk score is stored in the database 54.

Figure 3J:
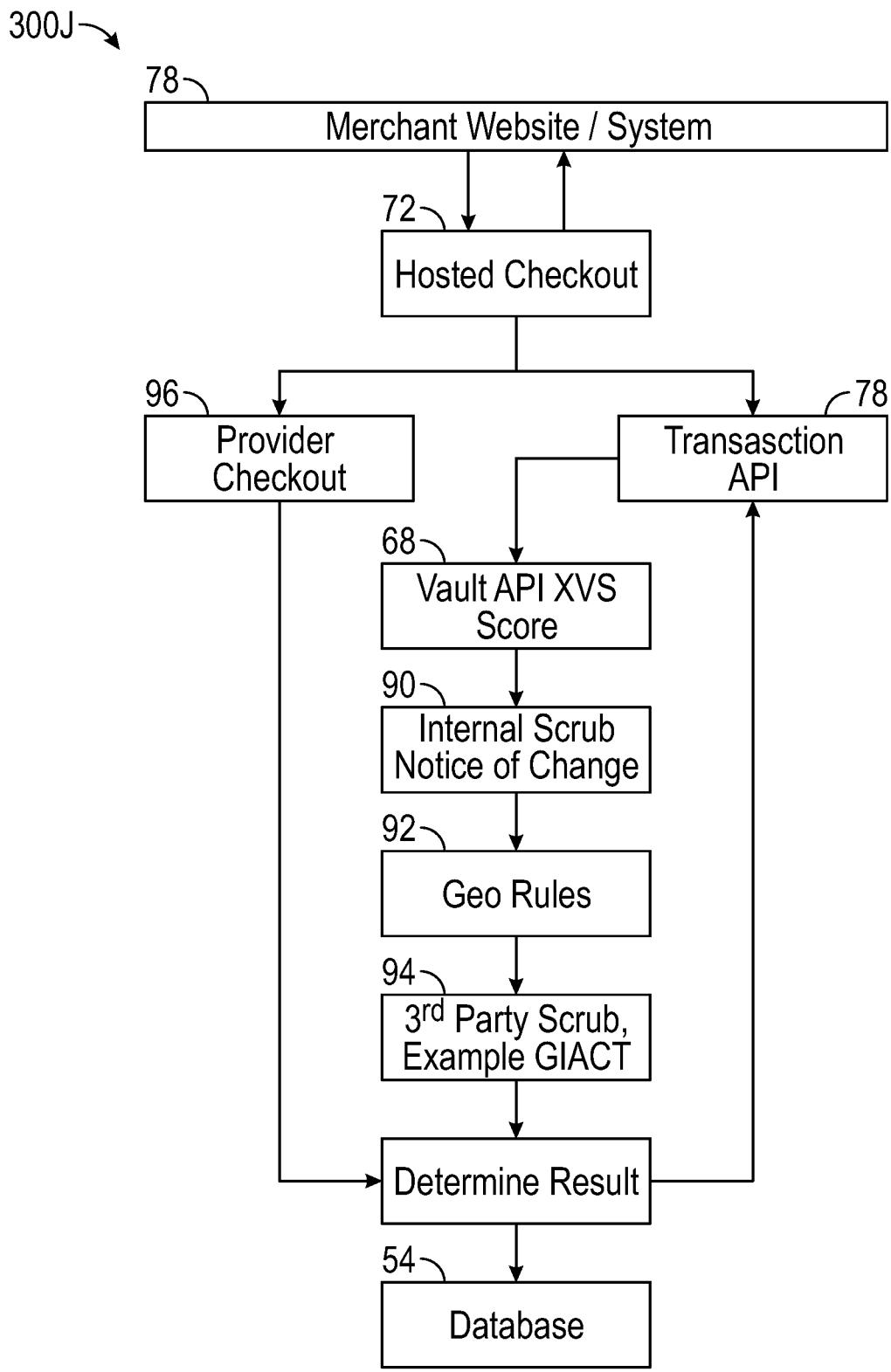

FIG. 3J is a block diagram 300J illustrating further architectural details regarding the checkout 72, according to certain aspects of the disclosure. In certain aspects, the checkout 72 receives the transaction request and communicates with either the transaction API 70 or a provider checkout 96. In certain aspects, the checkout 72 communicates the transaction request to the vault 68, via the transaction API 70, such that the management microservice 14g generates the risk score, which can be stored in the database 54. Similar to certain aspects described above, the management microservice 14g of the vault 68 generates the risk score by communicating with a scrub module 90, a geolocation rules module 92, and a fraud detection service 94. In certain aspects, the checkout 72 communicates the transaction request to the provider checkout 96 to generate a provider score, which can be stored in the database 54.

Figure 4A:
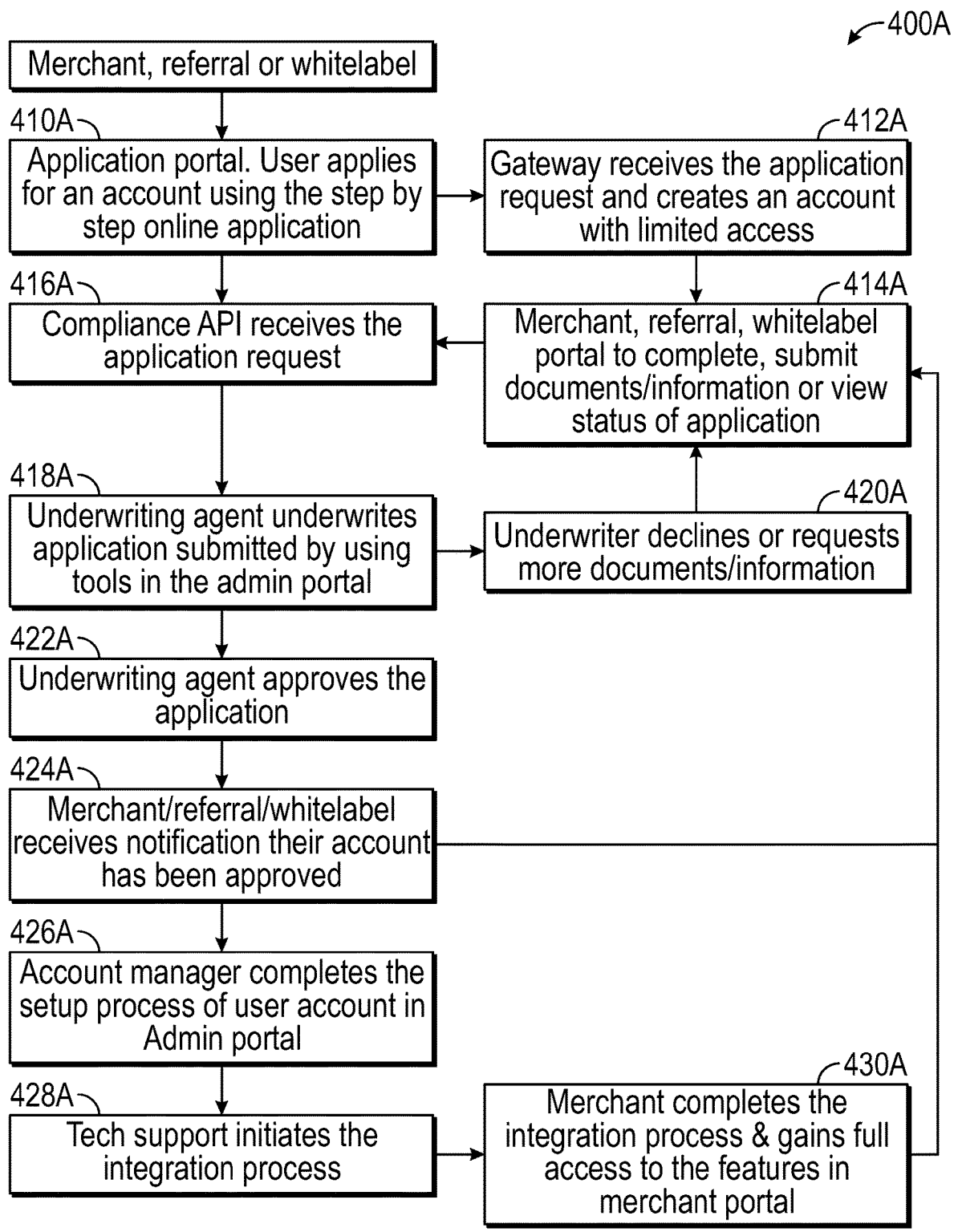
FIG. 4A illustrates an example process 400A for underwriting an application using the example payment gateway system 1000 of FIG. 2.

FIG. 4A illustrates an example process 400A for underwriting an application using the example payment gateway system 1000 of FIG. 2. While FIG. 4A is described with reference to FIG. 2, it should be noted that the process steps of FIG. 4A may be performed by other systems.

The process begins by proceeding to step 410A when the application microservice 14e receives an application request from an applicant such as, the merchant, the referral, or the white-label. In certain aspects, the application microservice 14e presents the online application to the applicant. As illustrated at step 412A, the gateway API 52 receives the application from the application microservice 14e and generates an applicant account with limited access. In certain aspects, the gateway API 52 transmits a request to the applicant (e.g., via the merchant portal 58, the referral portal 60, or the white-label portal 62) to complete the application or view the application, as illustrated at step 414A. As depicted at step 416A, the compliance portal 66 receives the application request from the application microservice 14e as well as any additional information from the gateway API 52 to complete the application. The compliance microservice 14f transmits the application to the administrative portal 56 so that an underwriting agent can review the application, as depicted at step 418A. When it is determined that the application requires further information the administrative microservice 14a transmits a request to the applicant, as depicted at step 420A, and continues to step 414A. On the other hand, when it is determined that application is approved, as depicted at step 422A, the administrative microservice 14a transmits a notification to the applicant that the application is approved, as depicted at step 424A.

As illustrated at step 426A, an account manager can complete the application setup process of the user account via the administrative portal 56. As illustrated at step 428A, a tech support personnel can initiate the integration process via the administrative portal 56. As depicted at step 430A, the account user, such as the merchant, completes the integration via the merchant portal 58 to gain full access to the user account, such as the merchant account.

Figure 4B:
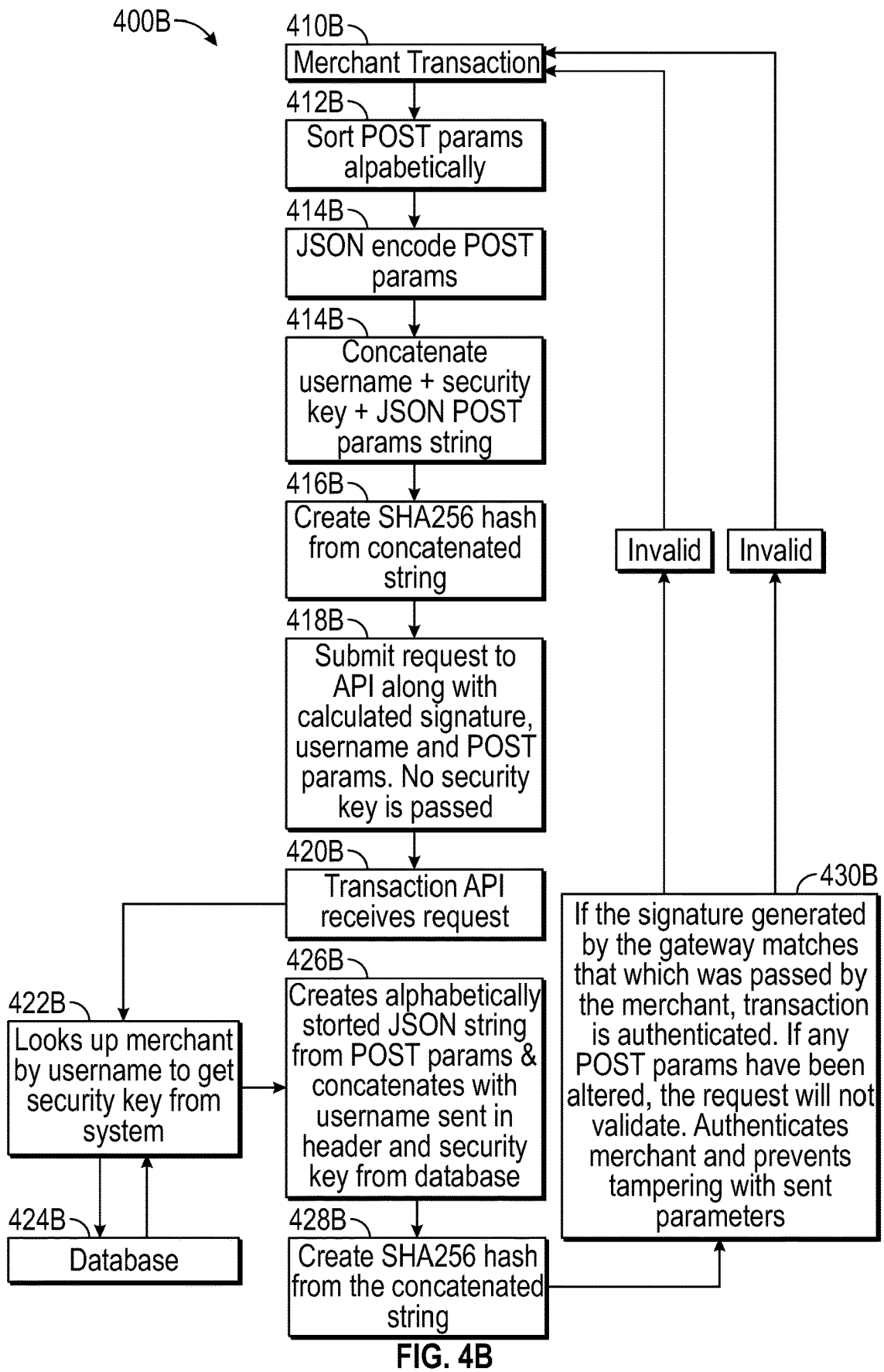
FIG. 4B illustrates an example process 400B for securing a transaction request using the example payment gateway system 1000 of FIG. 2.

FIG. 4B illustrates an example process 400B for securing a transaction request using the example payment gateway system 1000 of FIG. 2. While FIG. 4B is described with reference to FIG. 2, it should be noted that the process steps of FIG. 4B may be performed by other systems.

The process begins by proceeding to step 410B when a merchant device 16 associated with a merchant receives a transaction request from a customer device 16 associated with a customer. As illustrated at step 412B, the merchant device 16 alphabetically sorts the POST parameters of the transaction request. After sorting, as depicted at step 414B, the merchant device 16 encodes the alphabetically sorted POST parameters. In certain aspects, the alphabetically sorted POST parameters are encoded in JavaScript Object Notation (JSON) format. As illustrated at step 414B, the merchant device 16 concatenates the username associated with the merchant, the security key associated with the merchant, and the encoded POST parameters into a concatenated string. As depicted at step 416B, the merchant device 16 generates a SHA256 hash from the concatenated string to create a signature code. The merchant device 16 then transmits the transaction request along with the signature code, the username, and the POST parameters, as illustrated at step 418B.

As illustrated at step 420B, the transaction API 70 receives the transaction request along with the signature code, the username, and the POST parameters from the merchant device 16. The transaction microservice 14h of the transaction API 70 communicates with the database 54 to look up the merchant by the username received and to retrieve the security key associated with the username in the database 54, as illustrated in steps 422B and 424B. As illustrated at step 426B, the transaction microservice 14h generates a security string by creating an alphabetically sorting JSON string from the POST parameters received from the merchant device 16 and concatenating this with the username received from the merchant device 16 and the security key retrieved from the database 54. As depicted at step 428B, the transaction microservice 14h creates a SHA256 hash from the security string. As illustrated at step 430B, the transaction microservice 14h determines whether the security string matches the signature code. If the security string matches the signature code, then the transaction request is authenticated and a valid notification is transmitted to the merchant device 16. On the other hand, if the security string does not match the signature code (e.g., the POST parameters were altered), then the transaction request is not authenticated and an invalid notification is transmitted to the merchant device 16. As should be understood, the process 400B authenticates merchants and identifies whether the POST parameters had been tampered.

Figure 4C:
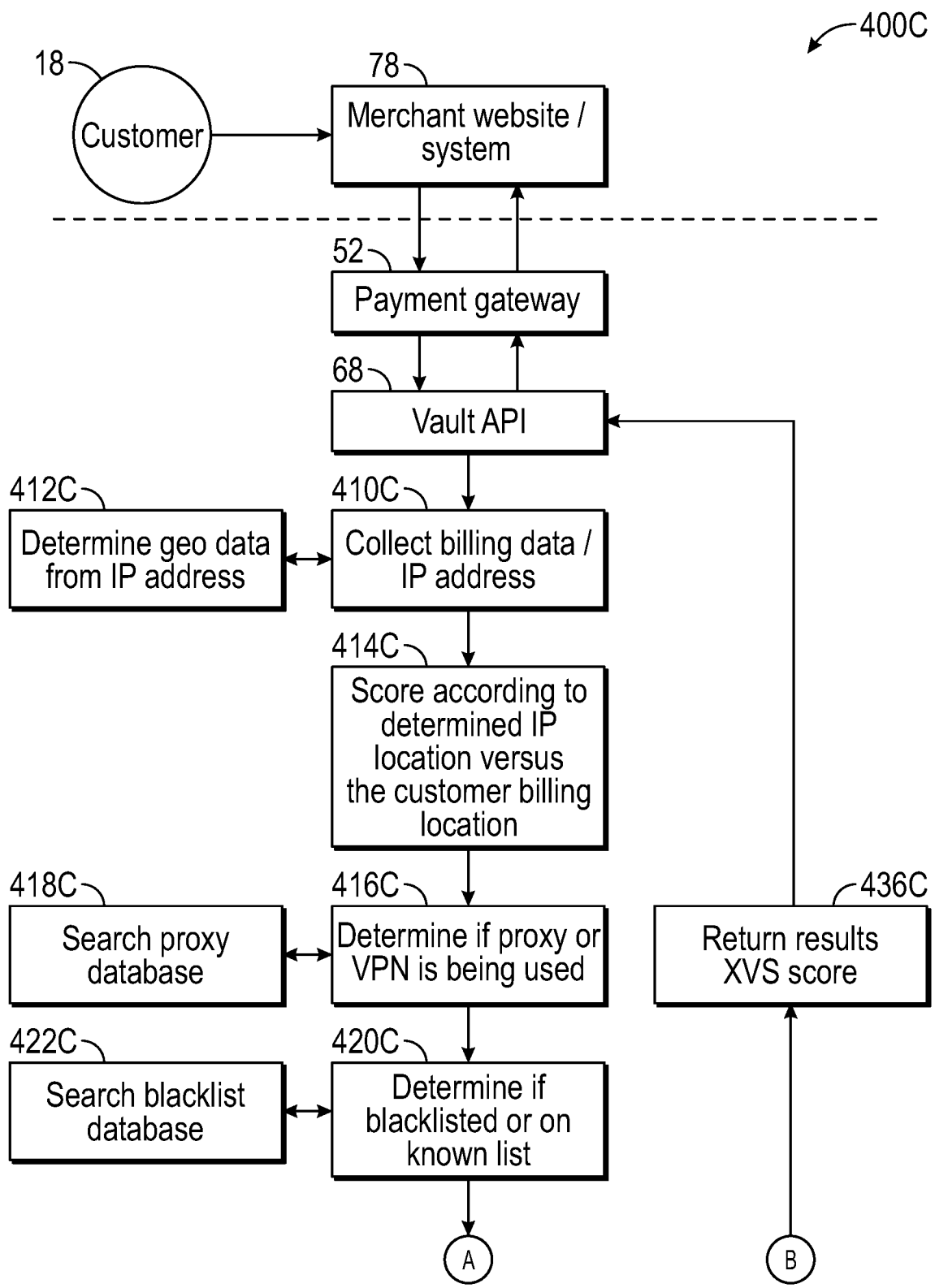
FIG. 4C illustrates an example process 400C for managing risk of a payment gateway using the example payment gateway system 1000 of FIG. 2.
Figure 4C:
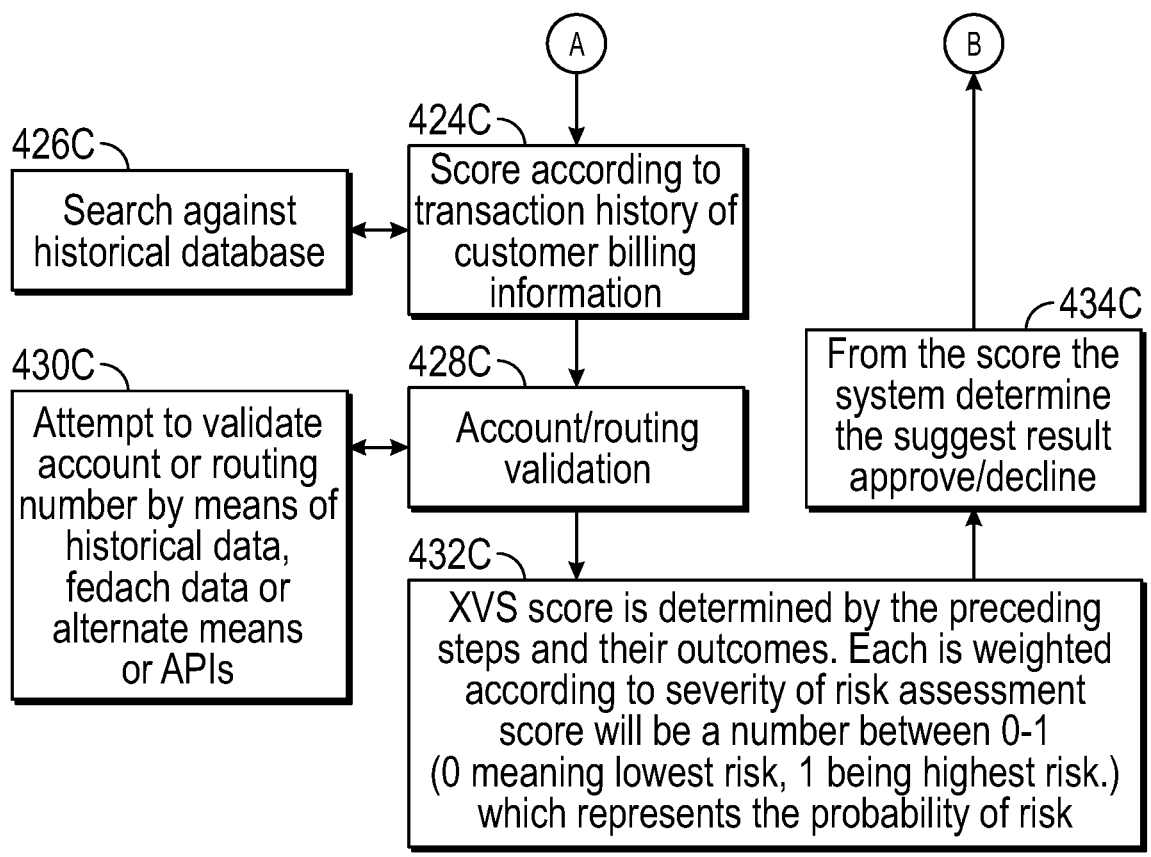

FIG. 4C illustrates an example process 400C for managing risk of a payment gateway using the example payment gateway system 1000 of FIG. 2. While FIG. 4C is described with reference to FIG. 2, it should be noted that the process steps of FIG. 4C may be performed by other systems.

After the vault 68 receives instructions from the gateway API 52 to generate a risk score associated with a transaction request, the process begins at step 410C when the management microservice 14g retrieves billing data and an IP address associated with the customer of the transaction request. As illustrated at step 412C, the management microservice 14g determines the geolocation data from the IP address. As depicted at step 414C, the management microservice 14g adjusts the risk score based on the geolocation data versus the billing data (e.g., customer billing address location). The management microservice 14g determines whether customer device 18 associated with the transaction is a proxy or a VPN, as illustrated at step 416C, by searching the proxy database 86, as illustrated at step 418C. When the customer device 18 is determined to be a proxy, the management microservice 14g can then determine whether the proxy is blacklisted or on a known list, as illustrated at step 420C, by searching the blacklist database 88, as illustrated step 422C. In certain aspects, the management microservice 14g adjusts the risk score based on determining whether the proxy is blacklisted.

As illustrated at step 424C, the management microservice 14g adjusts the risk score based on the transaction history of the customer billing information retrieved from the transaction database 82 (see step 426C). As illustrated in steps 428C and 430C, the management microservice 14g determines whether a banking account number of the customer information that is obtained corresponds with a previously stored banking account number that is stored in a database such as, but not limited to, the database 54, the transaction database 82, a third party data, or other database well-known in the industry. As illustrated at step 432C, the management microservice 14g adjusts the risk score based on the determinations made in the previous steps. In certain aspects, the risk score is weighted according to severity of risk assessment. In certain aspects, the risk score is a value between 0 and 1 with 0 indicating lowest risk and 1 indicating highest risk. As illustrated at step 434C, the management microservice 14g determines whether the risk score is below a predetermined threshold. In certain aspects, when the risk score is determined to be below a predetermined threshold the management microservice 14g approves the transaction request and returns an approved notification, along with the risk score, to the gateway API 52, as illustrated at step 436C. In certain aspects, when the risk score is determined to be above the predetermined threshold the management microservice 14g declines the transaction request and returns a declined notification, along with the risk score, to the gateway API.

Figure 4D:
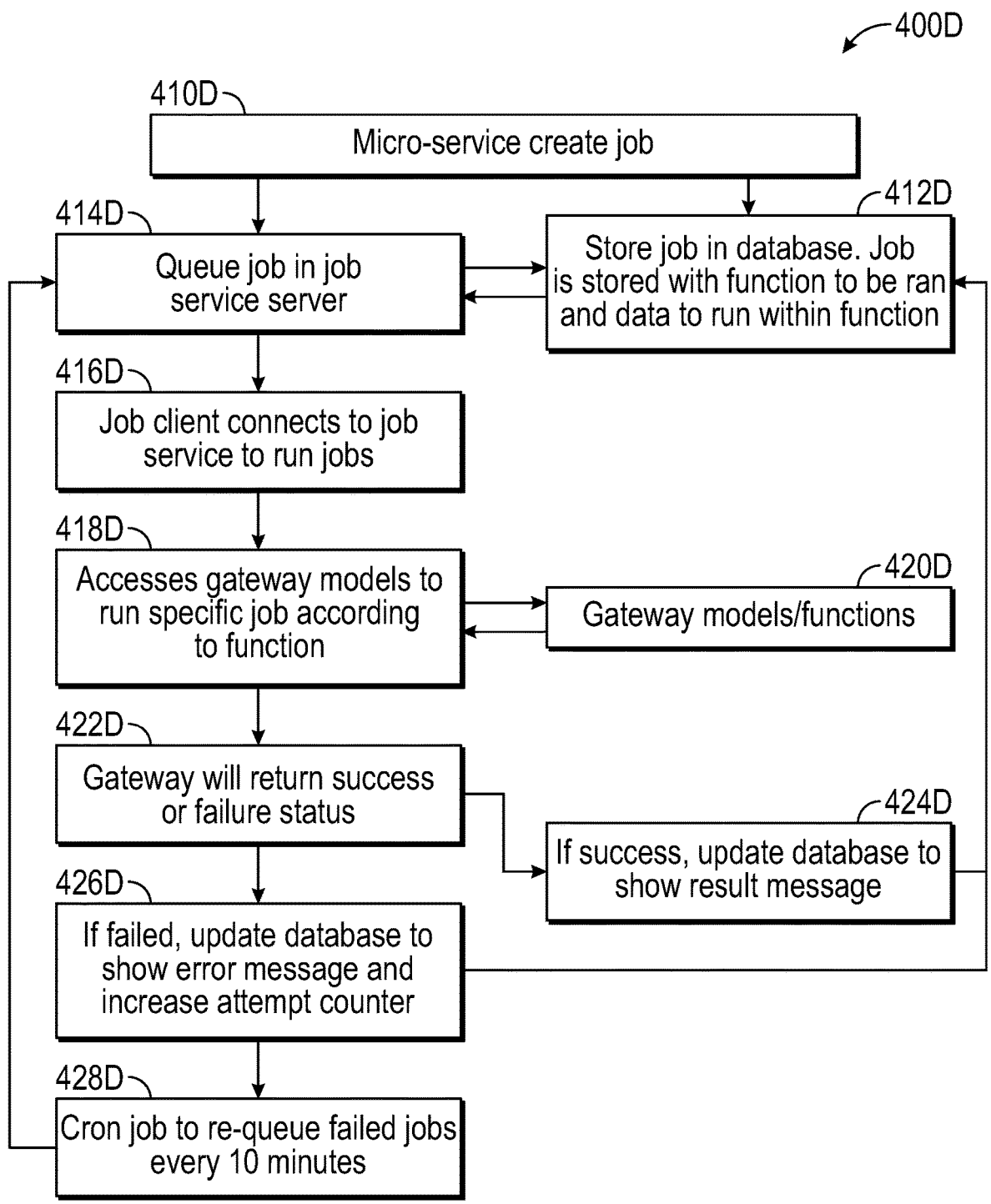
FIG. 4D illustrates an example process 400D for managing jobs in a payment gateway using the example payment gateway system 1000 of FIG. 2.

FIG. 4D illustrates an example process 400D for managing jobs in a payment gateway using the example payment gateway system 1000 of FIG. 2. While FIG. 4D is described with reference to FIG. 2, it should be noted that the process steps of FIG. 4D may be performed by other systems.

The process begins by proceed to step 410D when the job microservice 14i creates a job received from one of the microservices 14. As illustrated at step 412D, after the job microservice 14i creates the job, it stores the job in the database 54 with a function to be ran and with data to run within the function. As illustrated at step 414D, the job microservice 14i queues the job for execution. In certain aspects, the job microservice 14i queues the job in the job server 74. As illustrated in step 416D, the job microservice 14i communicates with one of the job clients 76 for assigning a next-in-line job in the queue. As illustrated in steps 418D and 420D, in certain aspects, the job microservice 14i access gateway models to run specific jobs according to the function. As illustrated at step 422D, the job microservice 14i receives a job status from the gateway API 52. When the job microservice 14i receives a successful job status it updates the database 54 with a successful result message indicating success, as illustrated at step 424D. Similarly, when the job microservice 14i is receives a failed job status it updates the database 54 with an error message and increases a job attempt counter, as illustrated as step 426D.

As illustrated at step 428D, when the job microservice 14i receives the failed job status it also instructs a cron job to re-queue the failed job. In certain aspects, the cron job re-queues the failed job every 10 minutes.

As can be seen, leveraging the power of such a distributed job server, such as the job server 74, the payment gateway system 1000 has the ability of doing work using the power of the cloud. For example, with each job created being stored in the database 54, the job microservice 14i communicates with the database 54 to delegate jobs to job clients 76 for completion. The job clients 76 can communicate with the job microservice 14i to complete these job s such that the number of job clients is scaled accordingly. In certain aspects, if a job happens to fail, the microservice 14i will queue that job to retry again up to a maximum of 10 times, for example.

Figure 4E:
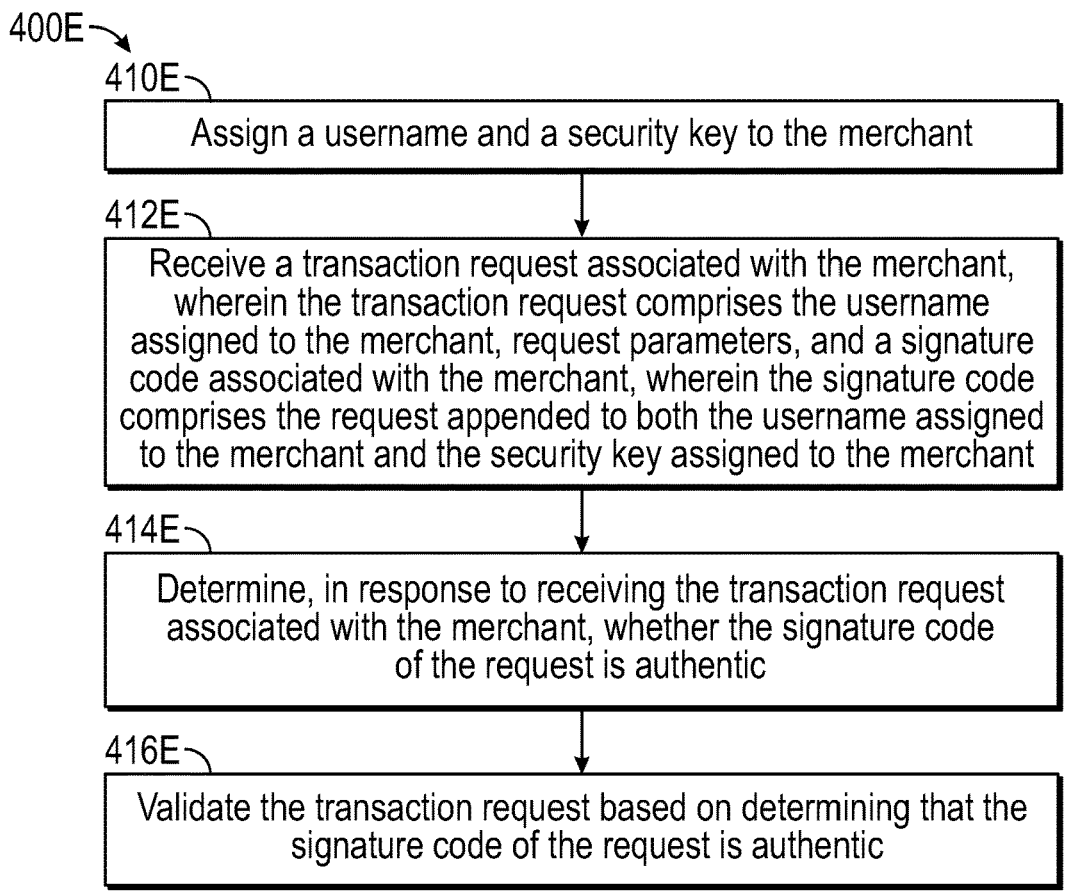
FIG. 4E illustrates an example process 400E for managing security of a payment gateway using the example payment gateway system 1000 of FIG. 2.

FIG. 4E illustrates an example process 400E for managing security of a payment gateway using the example payment gateway system 1000 of FIG. 2. While FIG. 4E is described with reference to FIG. 2, it should be noted that the process steps of FIG. 4E may be performed by other systems.

The process begins by proceed to step 410E when the payment gateway system 1000 assigns a username and a security key to the merchant. As illustrated at step 412D, the payment gateway system 1000 receives a transaction request associated with the merchant, wherein the transaction request comprises the username assigned to the merchant, request parameters, and a signature code associated with the merchant, wherein the signature code comprises the request appended to both the username assigned to the merchant and the security key assigned to the merchant. As illustrated at step 414D, the payment gateway system 1000 determines, in response to receiving the transaction request associated with the merchant, whether the signature code of the request is authentic. As illustrated at step 416D, the payment gateway system 1000 validates the transaction request based on determining that the signature code of the request is authentic.

Figure 4F:
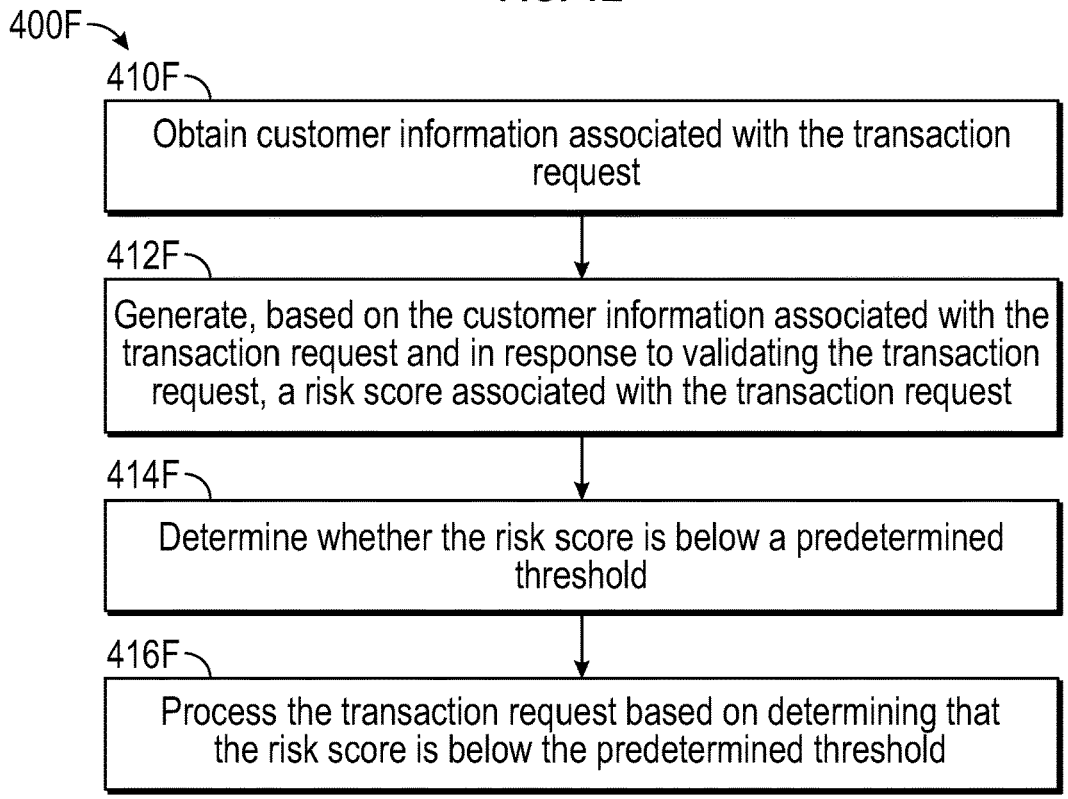
FIG. 4F illustrates an example process 400F for managing security of a payment gateway using the example payment gateway system 1000 of FIG. 2.

FIG. 4F illustrates an example process 400F for managing security of a payment gateway using the example payment gateway system 1000 of FIG. 2. While FIG. 4F is described with reference to FIG. 2, it should be noted that the process steps of FIG. 4F may be performed by other systems.

The process begins by proceed to step 410F when the payment gateway system 1000 obtains customer information associated with the transaction request. As illustrated at step 412F, the payment gateway system 1000 generates, based on the customer information associated with the transaction request and in response to validating the transaction request, a risk score associated with the transaction request. As illustrated at step 414F, the payment gateway system 1000 determines whether the risk score is below a predetermined threshold. As illustrated at step 416F, the payment gateway system 1000 processes the transaction request based on determining that the risk score is below the predetermined threshold.

Figure 5:
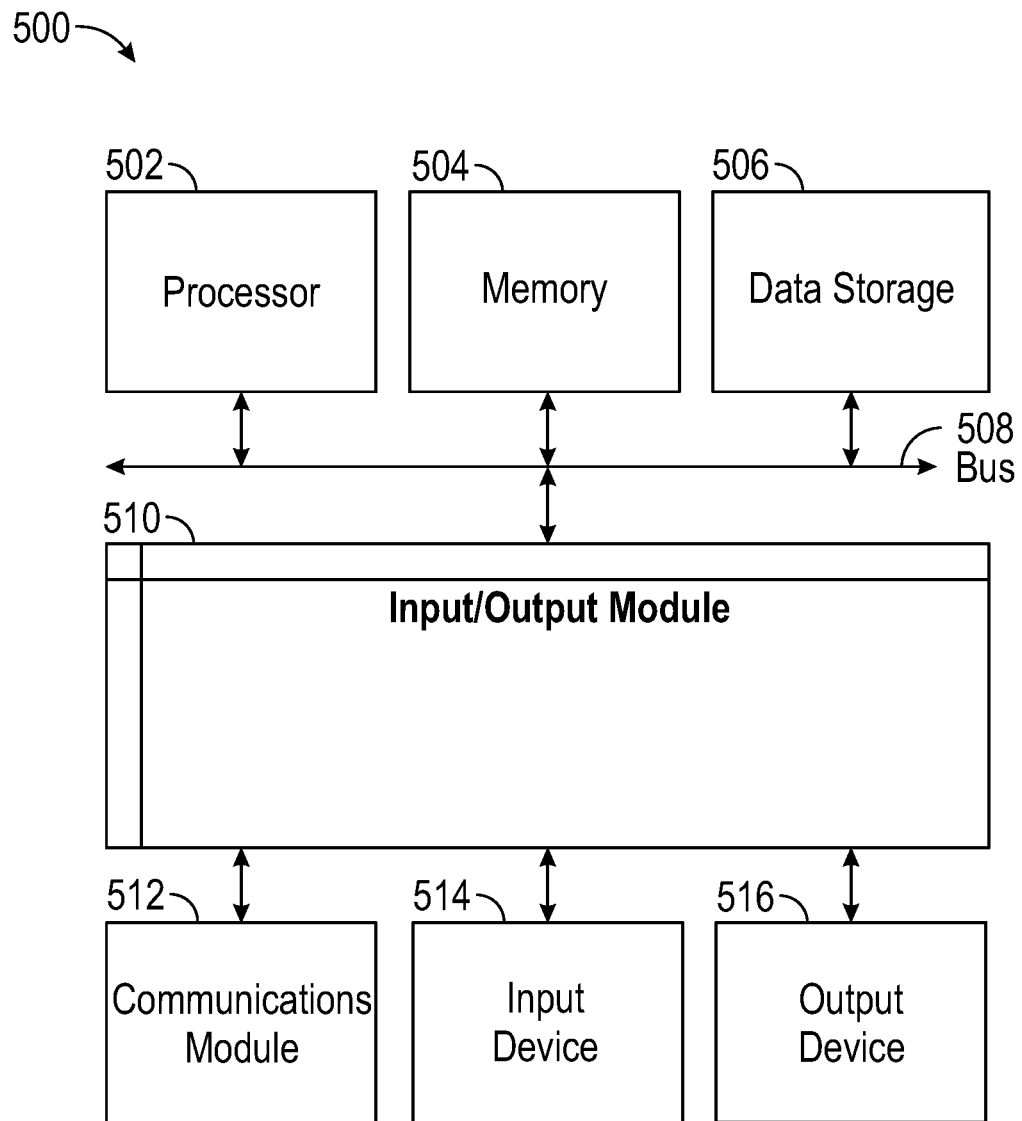
FIG. 5 is a block diagram illustrating an example computer system with which the servers, microservices, and devices of FIG. 2 can be implemented.

FIG. 5 is a block diagram illustrating an example computer system 500 with which the gateway server 12, the microservices 14, the merchant devices 16, and the customer devices 18 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., the gateway server 12, the microservices 14, the merchant devices 16, and the customer devices 18) includes a bus 508 or other communication mechanism for communicating information, and a processor 502 (e.g., the processor 34, 38, 42, 46) coupled with bus 508 for processing information. According to one aspect, the computer system 500 can be a cloud computing server of an IaaS that is able to support PaaS and SaaS services.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., the memory 36, 40, 44, 48), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, e.g., one or more modules of computer program instructions encoded on a computer readable medium for execution by, or to control the operation of, the computer system 500.

A computer program as discussed herein does not necessarily correspond to a file in a file system. A program can be stored in a portion of a file that holds other programs or data (e.g, one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices (e.g., the input device 50, the output device 52). The input/output module 510 can be any input/output module. Example input/output modules 510 include data ports such as USB ports. In addition, input/output module 510 may be provided in communication with processor 502, so as to enable near area communication of computer system 500 with other devices. The input/output module 510 may provide, for example, for wired communication in some implementations, or for wireless communication in other implementations, and multiple interfaces may also be used. The input/output module 510 is configured to connect to a communications module 512. Example communications modules 512 (e.g., the communications module 26, 28, 30, 32) include networking interface cards, such as Ethernet cards and modems.

In certain aspects, the input/output module 510 is configured to connect to a plurality of devices, such as an input device 514 (e.g., the input device 50) and/or an output device 516 (e.g., the output device 52). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device.

According to one aspect of the present disclosure, the gateway server 12, the microservices 14, the merchant devices 16, and the customer devices 18 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. Processor 502 may process the executable instructions and/or data structures by remotely accessing the computer program product, for example by downloading the executable instructions and/or data structures from a remote server through communications module 512 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a database server in the cloud-computing environment, or may be downloaded to a private storage device from the cloud-computing environment.

The term "machine-readable storage medium" or "computer-readable medium" as used herein refers to any medium or media that participates in providing instructions or data to processor 502 for execution. The term "storage medium" as used herein refers to any non-transitory media that store data and/or instructions that cause a machine to operate in a specific fashion. Such a medium may take many forms, including, but not limited to, non-volatile media, volatile media, and transmission media.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that comprise bus 508. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for managing security of a payment gateway, comprising:
   assigning a username and a security key to a merchant;
   receiving a transaction request associated with the merchant, wherein the transaction request comprises the username assigned to the merchant, request parameters, and a signature code associated with the merchant, wherein the signature code comprises the transaction request appended to both the username assigned to the merchant and the security key assigned to the merchant;
   generating a SHA256 signature hash of the signature code;
   receiving the transaction request comprising the signature hash of the signature code, the username assigned to the merchant, and the request parameters;
   retrieving, in response to receiving the transaction request associated with the merchant, the security key assigned to the merchant;
   generating a security string comprising the request parameters concatenated with the username assigned and the security key assigned to the merchant;
   generating a SHA256 security hash of the security string;
   determining whether the security string matches the signature code of the transaction request;
   validating the transaction request based on determining that the security string matches the signature code of the request;
   obtaining customer information associated with the transaction request;
   generating, based on the customer information associated with the transaction request and in response to validating the transaction request, a risk score associated with the transaction request;
   determining whether the risk score is below a predetermined threshold;
   processing the transaction request based on determining that the risk score is below the predetermined threshold;
   receiving, at a job microservice processor responsive to processing the transaction request, a job status information;
   determining, by the job microservice processor, that the job status information received is a successful job status; and
   updating, by the job microservice processor, based on a determination by the job microservice processor that the job status information received is the successful job status, a database with a corresponding message indicating the job status information is the successful job status.

2. The computer-implemented method of claim 1, further comprising:
   determining whether a submitted billing address of the customer information that is obtained corresponds with a location associated with an Internet Protocol (IP) address of a device associated with the transaction request;
   increasing, based on determining that the submitted billing address of the customer information that is obtained does not correspond with the location associated with the IP address of the device associated with the transaction request, the risk score; and
   decreasing, based on determining that the submitted billing address of the customer information that is obtained does correspond with the location associated with the IP address of the device associated with the transaction request, the risk score.

3. The computer-implemented method of claim 2, further comprising:
   determining whether the IP address of the device associated with the transaction request is a virtual private network (VPN);
   increasing, based on determining that the IP address of the device associated with the transaction request is the VPN, the risk score; and
   decreasing, based on determining that the IP address of the device associated with the transaction request is not the VPN, the risk score.

4. The computer-implemented method of claim 2, further comprising:
   determining whether the IP address of the device associated with the transaction request is a blacklisted proxy;
   increasing, based on determining that the IP address of the device associated with the transaction request is the blacklisted proxy, the risk score; and
   decreasing, based on determining that the IP address of the device associated with the transaction request is not the blacklisted proxy, the risk score.

5. The computer-implemented method of claim 1, further comprising:
   determining whether the customer information that is obtained corresponds with previously stored transaction history;
   increasing, based on determining that the customer information that is obtained does not correspond with the previously stored transaction history, the risk score; and
   decreasing, based on determining that the customer information that is obtained does correspond with the previously stored transaction history, the risk score.

6. The computer-implemented method of claim 1, further comprising:
   determining whether a routing number of the customer information that is obtained corresponds with a previously stored routing number;
   increasing, based on determining that the routing number of the customer information that is obtained does not correspond with the previously stored routing number, the risk score; and
   decreasing, based on determining that the routing number of the customer information that is obtained does correspond with the previously stored routing number, the risk score.

7. The computer-implemented method of claim 6, further comprising:
   determining whether a banking account number of the customer information that is obtained corresponds with a previously stored banking account number;
   increasing, based on determining that the banking account number of the customer information that is obtained does not correspond with the previously stored banking account number, the risk score; and decreasing, based on determining that the banking account number of the customer information that is obtained does correspond with the previously stored banking account number, the risk score.

8. The computer-implemented method of claim 1, wherein the transaction request is received from a customer device associated with the transaction request.

9. A system for managing security of a payment gateway, the system comprising:
a memory comprising instructions; and
one or more processors configured to execute the instructions which, when executed, cause the one or more processors to:
assign a username and a security key to a merchant;
receive a transaction request associated with the merchant, wherein the transaction request comprises the username assigned to the merchant, request parameters, and a signature code associated with the merchant, wherein the signature code comprises the request appended to both the username assigned to the merchant and the security key assigned to the merchant;
generate a SHA256 signature hash of the signature code;
receive the transaction request comprising the signature hash of the signature code, the username assigned to the merchant, and the request parameters;
retrieve, in response to receiving the transaction request associated with the merchant, the security key assigned to the merchant;
generate a security string comprising the request parameters concatenated with the username assigned and the security key assigned to the merchant;
generate a SHA256 security hash of the security string;
determine whether the security string matches the signature code of the request;
validate the transaction request based on determining that the security string matches the signature code of the request;
obtain customer information associated with the transaction request;
generate, based on the customer information associated with the transaction request and in response to validating the transaction request, a risk score associated with the transaction request;
determine whether the risk score is below a predetermined threshold;
process the transaction request based on determining that the risk score is below the predetermined threshold;
receive, at a job microservice processor responsive to processing the transaction request, a job status information;
determine, by the job microservice processor, that the job status information received is a successful job status; and
update, by the job microservice processor, based on a determination by the job microservice processor that the job status information received is the successful job status, a database with a corresponding message indicating the job status information is the successful job status.

10. The system of claim 9, wherein the processor is configured to execute the instructions which, when executed, cause the processor to:
determine whether a submitted billing address of the customer information that is obtained corresponds with a location associated with an Internet Protocol (IP) address of a device associated with the transaction request;
increase, based on determining that the submitted billing address of the customer information that is obtained does not correspond with the location associated with the IP address of the device associated with the transaction request, the risk score; and
decrease, based on determining that the submitted billing address of the customer information that is obtained does correspond with the location associated with the IP address of the device associated with the transaction request, the risk score.

11. The system of claim 10, wherein the processor is configured to execute the instructions which, when executed, cause the processor to:
determine whether the IP address of the device associated with the transaction request is a virtual private network (VPN);
increase, based on determining that the IP address of the device associated with the transaction request is the VPN, the risk score; and
decrease, based on determining that the IP address of the device associated with the transaction request is not the VPN, the risk score.

12. The system of claim 10, wherein the processor is configured to execute the instructions which, when executed, cause the processor to:
determine whether the IP address of the device associated with the transaction request is a blacklisted proxy;
increase, based on determining that the IP address of the device associated with the transaction request is the blacklisted proxy, the risk score; and
decrease, based on determining that the IP address of the device associated with the transaction request is not the blacklisted proxy, the risk score.

13. The system of claim 9, wherein the processor is configured to execute the instructions which, when executed, cause the processor to:
determine whether the customer information that is obtained corresponds with previously stored transaction history;
increase, based on determining that the customer information that is obtained does not correspond with the previously stored transaction history, the risk score; and
decrease, based on determining that the customer information that is obtained does correspond with the previously stored transaction history, the risk score.

14. The system of claim 9, wherein the processor is configured to execute the instructions which, when executed, cause the processor to:
determine whether a routing number of the customer information that is obtained corresponds with a previously stored routing number;
increase, based on determining that the routing number of the customer information that is obtained does not correspond with the previously stored routing number, the risk score; and
decrease, based on determining that the routing number of the customer information that is obtained does correspond with the previously stored routing number, the risk score.

15. A non-transitory machine-readable storage medium comprising machine- readable instructions for causing one or more processors to execute a method for managing security of a payment gateway, the method comprising:
assigning a username and a security key to a merchant;

receiving a transaction request associated with the merchant, wherein the transaction request comprises the username assigned to the merchant, request parameters, and a signature code associated with the merchant, wherein the signature code comprises the request appended to both the username assigned to the merchant and the security key assigned to the merchant;

generating a SHA256 signature hash of the signature code;

receiving the transaction request comprising the signature hash of the signature code, the username assigned to the merchant, and the request parameters;

retrieving, in response to receiving the transaction request associated with the merchant, the security key assigned to the merchant;

generating a security string comprising the request parameters concatenated with the username assigned and the security key assigned to the merchant;

generating a SHA256 security hash of the security string;

determining whether the security string matches the signature code of the transaction request;

validating the transaction request based on determining that the security string matches the signature code of the request;

obtaining customer information associated with the transaction request;

generating, based on the customer information associated with the transaction request and in response to validating the transaction request, a risk score associated with the transaction request;

determining whether the risk score is below a predetermined threshold;

processing the transaction request based on determining that the risk score is below the predetermined threshold;

receiving, at a job microservice processor responsive to processing the transaction request, a job status information;

determining, by the job microservice processor, that the job status information received is a successful job status;

updating, by the job microservice processor, based on a determination by the job microservice processor that the job status information received is the successful job status, a database with a corresponding message indicating the job status information is the successful job status.

16. The non-transitory machine-readable storage medium of claim 15, wherein the method comprises:

determining whether a submitted billing address of the customer information that is obtained corresponds with a location associated with an Internet Protocol (IP) address of a device associated with the transaction request;

increasing, based on determining that the submitted billing address of the customer information that is obtained does not correspond with the location associated with the IP address of the device associated with the transaction request, the risk score; and decreasing, based on determining that the submitted billing address of the customer information that is obtained does correspond with the location associated with the IP address of the device associated with the transaction request, the risk score.

17. The non-transitory machine-readable storage medium of claim 16, wherein the method comprises:

determining whether the IP address of the device associated with the transaction request is a virtual private network (VPN);

increasing, based on determining that the IP address of the device associated with the transaction request is the VPN, the risk score; and decreasing, based on determining that the IP address of the device associated with the transaction request is not the VPN, the risk score.

18. The non-transitory machine-readable storage medium of claim 17, wherein the method comprises:

determining whether the IP address of the device associated with the transaction request is a blacklisted proxy;

increasing, based on determining that the IP address of the device associated with the transaction request is the blacklisted proxy, the risk score; and decreasing, based on determining that the IP address of the device associated with the transaction request is not the blacklisted proxy, the risk score.

* * * * *